US011037248B1

(12) United States Patent
Davis et al.

(10) Patent No.: US 11,037,248 B1
(45) Date of Patent: Jun. 15, 2021

(54) COST SHARING BASED UPON IN-CAR AUDIO

(71) Applicant: State Farm Mutual Automobile Insurance Company, Bloomington, IL (US)

(72) Inventors: Justin Davis, Normal, IL (US); Kristopher Keith Gaudin, Bloomington, IL (US); Craig Benjamin Cope, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 16/052,733

(22) Filed: Aug. 2, 2018

Related U.S. Application Data

(60) Provisional application No. 62/570,925, filed on Oct. 11, 2017, provisional application No. 62/570,944, (Continued)

(51) Int. Cl.
*G06Q 40/08* (2012.01)
*H04R 1/40* (2006.01)
(Continued)

(52) U.S. Cl.
CPC .............. *G06Q 40/08* (2013.01); *G01S 15/04* (2013.01); *G06Q 20/29* (2013.01); *G06Q 20/322* (2013.01);
(Continued)

(58) Field of Classification Search
CPC ...... G06Q 40/08; G06Q 20/29; G06Q 20/322; G01S 15/04; G01S 15/101; G01S 15/88;
(Continued)

(56) References Cited

U.S. PATENT DOCUMENTS 6,186,537 B1   2/2001   Breed et al.
6,254,127 B1   7/2001   Breed et al.
(Continued)

FOREIGN PATENT DOCUMENTS

EP   3410382 A1 * 12/2018 ............. G06Q 40/08

OTHER PUBLICATIONS

W. Z. Khan, Y. Xiang, M. Y. Aalsalem and Q. Arshad, "Mobile Phone Sensing Systems: A Survey," in IEEE Communications Surveys & Tutorials, vol. 15, No. 1, pp. 402-427, First Quarter 2013, doi: 10.1109/SURV.2012.031412.00077. (Year: 2013).*

*Primary Examiner* — Bruce I Ebersman
*Assistant Examiner* — Steven R Chism

(57) ABSTRACT

Systems and methods may transmit a plurality of locationing pulse requests from a mobile device in a vehicle to an audio system of the vehicle during a period of operation of the vehicle. The audio system may have an array of speakers disposed inside the vehicle, and the locationing pulse requests may include a request to emit a locationing pulse from the array of speakers. The systems and methods may receive the locationing pulse at a microphone of the mobile device, and further determine, based upon the locationing pulse received at the microphone, that non-driver passengers were inside the vehicle for part of the period of operation of the vehicle. The systems and methods may determine an identity associated with each of the non-driver passengers, and subsequently transmit a request to share costs of the vehicle during the period of operation of the vehicle to the mobile device.

22 Claims, 11 Drawing Sheets

Related U.S. Application Data filed on Oct. 11, 2017, provisional application No. 62/570,956, filed on Oct. 11, 2017, provisional application No. 62/570,969, filed on Oct. 11, 2017.

(51) Int. Cl.
  *H04R 29/00* (2006.01)
  *G06Q 20/22* (2012.01)
  *G01S 15/04* (2006.01)
  *G06Q 20/32* (2012.01)

(52) U.S. Cl.
  CPC ............ *H04R 1/403* (2013.01); *H04R 29/002* (2013.01); *H04R 2499/13* (2013.01)

(58) Field of Classification Search
  CPC ............ G01S 13/524; G01S 21/01536; G01S 21/01542; G01S 5/06; G01S 5/30; G01S 11/16; G01S 15/104; G01S 15/42; G01S 1/805; G01S 13/89; G01S 1/70; G01S 1/76; G01S 1/80; G01S 5/16; G01S 5/22; H04R 1/403; H04R 29/002; H04R 2499/13; H04R 3/12; H04R 5/02; H04R 1/406; H04R 3/005; H04R 1/26; H04W 4/04; H04W 64/00; H04W 84/12; H04W 4/80; H04W 4/02; H04W 4/023; H04W 4/025; H02J 50/40
  See application file for complete search history.

(56) References Cited

U.S. PATENT DOCUMENTS

| | | | |
|---|---|---|---|
| 6,501,536 B1 | 12/2002 | Fredricks | |
| 6,507,779 B2 | 1/2003 | Breed et al. | |
| 8,095,305 B2* | 1/2012 | Huang | G06Q 50/01 |
| | | | 701/517 |
| 8,880,270 B1 | 11/2014 | Ferguson et al. | |
| 9,053,516 B2 | 6/2015 | Stempora | |
| 9,177,429 B2* | 11/2015 | Lawrenson | B60W 50/085 |
| 9,715,711 B1 | 7/2017 | Konrardy et al. | |
| 9,783,159 B1 | 10/2017 | Potter | |
| 10,360,636 B1 | 7/2019 | Kraft et al. | |
| 2005/0240324 A1 | 10/2005 | Boman | |
| 2008/0255888 A1 | 10/2008 | Berkobin et al. | |
| 2008/0277183 A1 | 11/2008 | Huang et al. | |
| 2009/0055180 A1 | 2/2009 | Coon | |
| 2010/0030586 A1 | 2/2010 | Taylor et al. | |
| 2010/0066513 A1 | 3/2010 | Bauchot et al. | |
| 2010/0131300 A1 | 5/2010 | Collopy et al. | |
| 2010/0131303 A1* | 5/2010 | Collopy | G06Q 30/0224 |
| | | | 705/4 |
| 2010/0131304 A1 | 5/2010 | Collopy et al. | |
| 2010/0201505 A1 | 8/2010 | Honary et al. | |
| 2013/0054281 A1* | 2/2013 | Thakkar | G06Q 50/30 |
| | | | 705/5 |
| 2013/0278415 A1* | 10/2013 | Morgan, Jr. | G08B 21/24 |
| | | | 340/539.13 |
| 2014/0100892 A1 | 4/2014 | Collopy et al. | |
| 2014/0297220 A1* | 10/2014 | Raffa | B60R 16/037 |
| | | | 702/150 |
| 2014/0335902 A1* | 11/2014 | Guba | H04W 48/04 |
| | | | 455/456.4 |
| 2014/0379384 A1 | 12/2014 | Duncan et al. | |
| 2015/0025917 A1 | 1/2015 | Stempora | |
| 2015/0149042 A1 | 5/2015 | Cooper et al. | |
| 2015/0166009 A1* | 6/2015 | Outwater | B60R 25/04 |
| | | | 701/2 |
| 2015/0199765 A1 | 7/2015 | Noonan | |
| 2016/0248904 A1 | 8/2016 | Duvaut | |
| 2016/0252796 A1* | 9/2016 | Smith | G02F 1/133385 |
| | | | 349/196 |
| 2016/0266235 A1* | 9/2016 | Hannon | G01S 5/30 |
| 2016/0364678 A1 | 12/2016 | Cao | |
| 2016/0371788 A1 | 12/2016 | Rackley, III | |
| 2017/0116696 A1* | 4/2017 | Moore | G06Q 30/04 |
| 2017/0195936 A1* | 7/2017 | Want | H04W 64/00 |
| 2017/0221150 A1* | 8/2017 | Bichacho | G06Q 50/30 |
| 2017/0249797 A1 | 8/2017 | Elie | |
| 2018/0189717 A1* | 7/2018 | Cao | G06Q 50/30 |
| 2018/0225769 A1 | 8/2018 | Slusar | |
| 2018/0252796 A1* | 9/2018 | Qu | G01S 5/30 |
| 2018/0322342 A1 | 11/2018 | Clifford | |
| 2019/0005412 A1 | 1/2019 | Matus et al. | |
| 2019/0019133 A1 | 1/2019 | Allen | |

\* cited by examiner

COST SHARING BASED UPON IN-CAR AUDIO

CROSS REFERENCE TO RELATED APPLICATIONS

The present disclosure claims the benefit of U.S. Provisional Patent Application No. 62/570,925, entitled "Detecting Transportation Company Trips in a Vehicle Based Upon On-Board Audio Signals" filed on Oct. 11, 2017, U.S. Provisional Patent Application No. 62/570,944, entitled "Recommendations to an Operator of Vehicle Based upon Vehicle Usage Detected By In-Car Audio Signals" filed on Oct. 11, 2017, U.S. Provisional Patent Application No. 62/570,956, entitled "Cost Sharing Based upon In-Car Audio Signals" filed on Oct. 11, 2017, and U.S. Provisional Patent Application No. 62/570,969, entitled "Cost Sharing Based upon In-Car Audio Signals" filed on Oct. 11, 2017, all of which are hereby incorporated herein by reference in their entirety.

TECHNICAL FIELD

The present disclosure relates generally to detecting transportation network company trips in a vehicle. More particularly, the present disclosure relates to detecting transportation network company trips in a vehicle based upon in-car audio signals, and assessing risk associated with transportation network company trips.

BACKGROUND

With the rise in popularity of ridesharing, transportation network companies (TNC), such as Lyft and Uber, have been able to pair passengers with a driver who provides the passengers with transportation on the driver's personal vehicle. Conventionally, TNCs offer passengers the ability to request service via their mobile devices. The mobile device may track the location of the driver and determine when the vehicle will arrive. The TNC may monitor the service. The TNC industry is rapidly changing the livery/taxi industry by using the latest mobile technology to facilitate rides for hire.

With these new transportation services in the marketplace, drivers are exposed to new risks. Additionally, personal auto policies may not extend coverage to the use of personal cars as taxis or livery vehicles, including their use in TNC services.

SUMMARY OF THE DISCLOSURE

The present embodiments disclose systems and methods that may generally relate to detecting transportation network company (TNC) trips in a vehicle, and particularly, inter alia, to detecting TNC trips in a vehicle based upon on-board audio signals, and assessing risk associated with transportation network company trips.

In one aspect, a computer-implemented method for cost sharing among occupants of a vehicle may be provided. The method may transmit a plurality of locationing pulse requests from a mobile device in a vehicle to an audio system of the vehicle during a period of operation of the vehicle. The audio system may have an array of speakers disposed inside the vehicle, and the locationing pulse requests may include a request to emit a locationing pulse from at least one of the array of speakers. The method may receive the locationing pulse at a microphone of the mobile device, and further determine, based upon the locationing pulse received at the microphone, that one or more non-driver passengers were inside the vehicle for at least part of the period of operation of the vehicle. The method may determine an identity associated with each of the one or more non-driver passengers, and further transmit a request to share costs of the vehicle during the period of operation of the vehicle to the mobile device.

In some embodiments, the method may determine the identity associated with each of the one or more non-driver passengers from a wireless communication between the mobile device and other mobile devices associated with each of the one or more non-driver passengers, by receiving the locationing pulse at other mobile devices associated with each of the one or more non-driver passengers, and/or by receiving a transmission from a mobile device associated with one of the one or more non-driver passengers, the transmission indicating that one of the one or more non-driver passengers was present in the vehicle during at least part of the period of operation. The request to share costs may include a request for the identity of one or more of the non-driver passengers, may be based at least in part on a distance traveled by the vehicle during the period of operation, and/or may include the identity of a reimbursing entity. As a result, policyholders may be notified to extend coverage of their personal auto policies to include the use of their personal cars in TNC trips, or may be notified in other ways to mitigate risks associated with TNC driving. The method may include additional, less, or alternate actions, including those discussed elsewhere herein.

In another aspect, a computer system for cost sharing among occupants of a vehicle may be provided. The computer system may include one or more processors and transceivers. The computer system may include one or more memory units configured to store non-transitory computer executable instructions, and a processor configured to interface with the one or more memory units. The processor may be configured to execute the non-transitory computer executable instructions to cause the processor to (i) receive locationing pulse data, the locationing pulse data being based upon locationing pulses received by one or more mobile devices from an audio subsystem of a vehicle; (ii) determine a vehicle occupancy profile of the vehicle based upon the received locationing pulse data, the vehicle occupancy profile associated with one or more non-driver passengers; (iii) assess a cost of operation of the vehicle during a period of operation; and/or (iv) transmit a request to share the cost of operation of the vehicle during the period of operation to one of the one or more non-driver passengers based upon the vehicle occupancy profile.

In some embodiments, the processor may be configured to receive an agreement from one of the one or more non-driver passengers to pay part of the cost of operation of the vehicle during the period of operation. The agreement to pay part of the cost of operation of the vehicle during the period of operation may be based upon a vehicle mileage during the period of operation of the vehicle, may include a real-time deposit of money during the period of operation of the vehicle, may include payment of fees incurred during the period of operation of the vehicle, and/or may be based upon a length of time that one of the one or more non-driver passengers occupied the vehicle during the period of operation. The processor may be configured to receive an identity of one of the non-driver passengers from a driver of the vehicle. The computer system may include additional, less, or alternate functionality, including that discussed elsewhere herein.

In another aspect, a computer-implemented method for cost sharing insurance costs of a vehicle may be provided. The method may (i) transmit a plurality of requests to a vehicle to emit locationing pulses from an audio subsystem of the vehicle during a period of operation of the vehicle, the audio subsystem having an array of speakers disposed inside the vehicle, and the locationing pulse requests including a request to emit a locationing pulse from at least one of the array of speakers; (ii) receive occupancy data during the period of operation from the vehicle in response to the requests to emit locationing pulses; (iii) determine one or more passenger profiles based upon the occupancy data; and/or (iv) transmit a request to share insurance costs of the vehicle during the period of operation.

The request to share insurance costs may be based at least in part on insurance coverage associated with at least one of the one or more passenger profiles, and/or may include usage-based insurance pricing. In some embodiments, the method may transmit the request to share insurance costs to a person associated with one of the passenger profiles, to an entity not associated with one of the passenger profiles, and/or to a person associated with one of the passenger profiles such that insurance costs may be prorated according to a length of time the person was inside the vehicle during the period of operation. The method may include additional, less, or alternate actions, including those discussed elsewhere herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
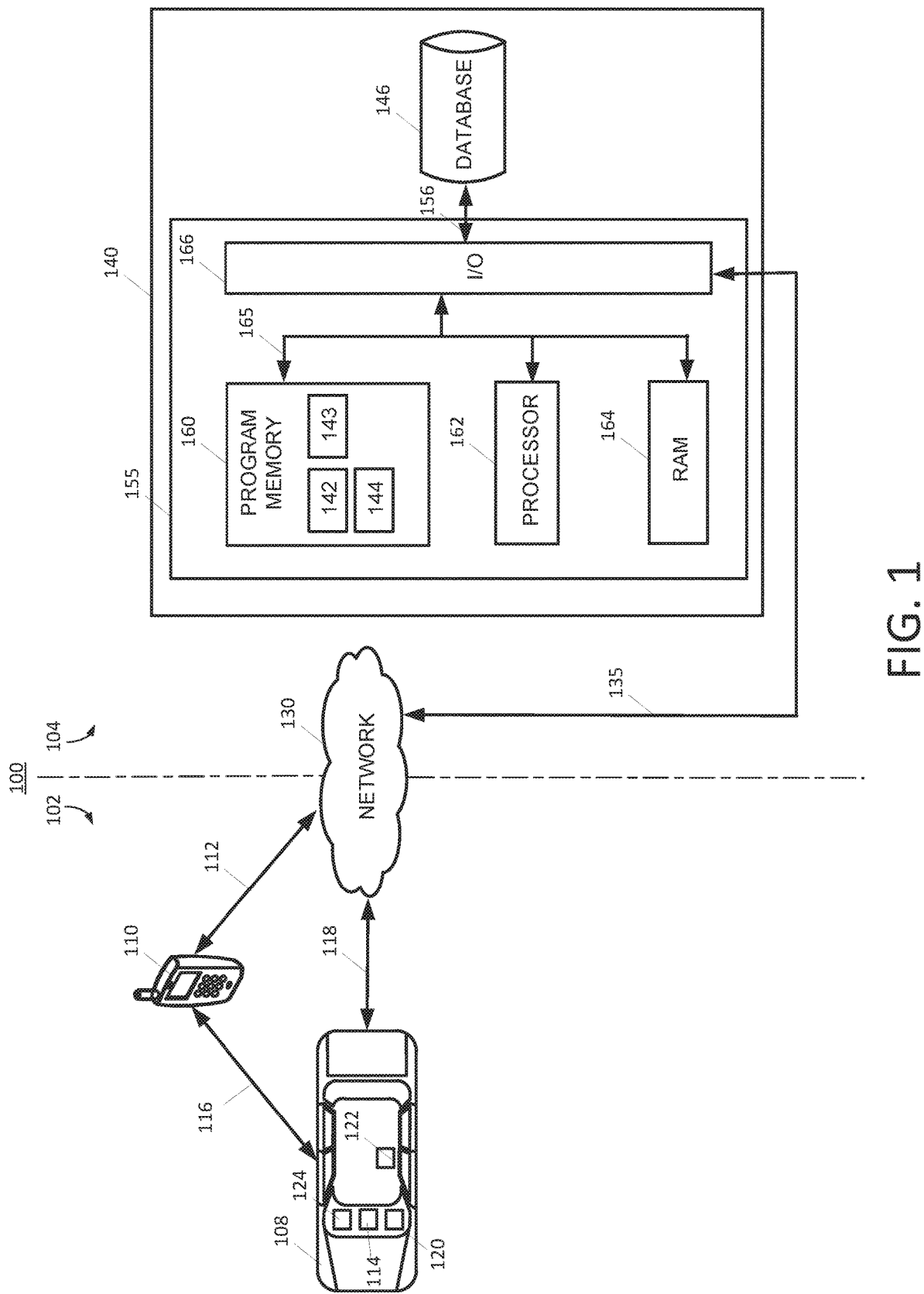
FIG. 1 illustrates a block diagram of an exemplary interconnected wireless communication system on which the methods described herein may be implemented.

The Figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTIONS

The present embodiments disclose systems and methods that may generally relate to detecting transportation network company (TNC) trips in a vehicle, and particularly, inter alia, to detecting TNC trips in a vehicle based upon on-board audio signals, and assessing risk associated with transportation network company trips.

The present embodiments may allow policyholders to have his/her personal auto policy fill in the coverage gaps left by TNC-provided insurance in order to provide the driver with the full liability coverage limits carried on his/her auto policy during the period of time when the driver is available for hire, and during all periods of TNC driving or vehicle operation. Also, policyholders may either be notified to extend coverage of their personal auto policies to include the use of their personal cars in TNC trips, and/or to be notified of ways to mitigate risks associated with TNC driving.

The present embodiments may (1) detect TNC operation or rides, and/or ride sharing among passengers; (2) generate suggestions to the driver or passengers (e.g., suggestions to switch drivers, suggestions to make changes to driving style to improve safety and/or efficiency, suggestions on purchasing on new vehicle, and suggestions to perform needed vehicle maintenance); (3) facilitate cost sharing (e.g., cost sharing among drivers when more than one person drives the same vehicle, sharing carpooling costs or road tripping costs, sharing tolls or traffic tickets, etc.); and/or (4) altering or adjusting insurance costs based upon vehicle load, vehicle usage, or vehicle or driver profiles or models.

In one aspect, a computer-implemented method and system may detect TNC trips in vehicle based upon in-car audio signals. An insurer may require a TNC endorsement or other adjustment to an insurance agreement if the policy covers TNC trips. A vehicle may emit audio signals from the vehicle's sound system in a frequency band that is not detectable by humans. Electronic devices associated with individual passengers in the vehicle may detect the audio signals to reveal configuration information regarding the inside of the vehicle (e.g., location of the electronic device within the vehicle, whether a seat is occupied by a person or thing, etc.). Insurers may detect whether a trip is likely to be a TNC trip or not to determine risk associated with insuring the vehicle based on the in-car audio signals (e.g., whether occupants of the vehicle match a TNC pattern wherein passengers join/leave the vehicle in many trips without clear start/end points in an area). More TNC trips may therefore be detected and the risk of insuring a driver who makes TNC trips may be more accurately determined.

In another aspect, a computer-implemented method and system may generate recommendations on vehicle operation based upon vehicle usage detected by in-car audio signals. A vehicle may emit audio signals from the vehicle's sound system in a frequency band that is not detectable by humans. Electronic devices associated with individual passengers in the vehicle may detect the audio signals to reveal configuration information regarding the inside of the vehicle (e.g., location of one or more electronic devices within the vehicle, whether a seat is occupied by a person or thing, etc.). Usage patterns of a vehicle or of multiple vehicles operated by the same driver may be detected based upon the configuration information detected by an electronic device (e.g., whether the driver could save money by driving a more efficient car if seats are usually empty; whether the driver tends to employ dangerous or inefficient driving techniques; whether a fatigued driver could improve safety by letting another passenger drive; whether a vehicle is likely to require maintenance; etc.). Recommendations may also be made to a vehicle operator for tuning or configuring the vehicle based on the detected usage patterns (e.g., selection of tires, engine tuning parameters, fuel type, optional equipment, etc.).

In another aspect, a computer-implemented method and system may facilitate cost sharing based upon in-car audio signals. A vehicle may emit audio signals from the vehicle's sound system in a frequency band that is not detectable by humans. Electronic devices associated with individual passengers in the vehicle may detect the audio signals to reveal configuration information regarding the inside of the vehicle (e.g., location of an electronic device within the vehicle, whether a seat is occupied by a person or thing, etc.). The vehicle interior configuration information may include the identity of occupants in a vehicle and the electronic device may provide payment capabilities for the occupants to share costs (e.g., insurance costs, toll costs, fuel costs, congestion fee costs, depreciation costs, etc.). Knowing the identity of vehicle occupants also improves cost estimation (e.g., based upon age and driving experience of occupants; whether occupants have been associated with high risk; etc.).

In another aspect, a computer-implemented method and system may facilitate assessing vehicle risk based upon in-car audio signals. A vehicle may emit audio signals from the vehicle's sound system in a frequency band that is not detectable by humans. Electronic devices associated with individual passengers in the vehicle may detect the audio signals to reveal configuration information regarding the inside of the vehicle (e.g., location of an electronic device within the vehicle, whether a seat is occupied by a person or thing, etc.). The configuration information may be used to create a customized risk profile for an individual passenger. A customized risk profile may be used to issue a personal mobility insurance policy based upon the vehicle situations frequently encountered by a passenger and/or a usage-based insurance model.

Audio pings between mobile devices and vehicle-mounted sensors and/or microphones may be able identify a location of a mobile device within a vehicle, and thus a location of a driver or passenger within the vehicle (assuming the mobile device is on a person's body). For instance, triangulation, time-of-flight, and/or other techniques may be used. If a person is identified as a driver, their mobile device may collect telematics data as being relevant to the driver's driving behavior or driving profile. Conversely, if the person is identified as a passenger, their mobile device may collect telematics data as being relevant to driver behavior associated with the passenger traveling in a vehicle as a passenger, such as being relevant to a mobility or passenger profile.

The driving and/or mobility profiles may also be updated with environmental data during vehicle operation, such as weather, traffic, road, congestion, and construction data—which may be collected from mobile device sensors, vehicle-mounted sensors, and/or smart infrastructure. The driving and/or mobility profiles may be used to generate usage-based insurance (UBI) quotes for drivers and/or passengers, and for TNC and non-TNC vehicle operation.

The present embodiments may make recommendations or automatically adjust autonomous vehicle system or feature settings or configurations to optimize or reduce risk. In some embodiments, a pre-trip offer of insurance for a given number of miles at a specific rate per mile may be generated and transmitted to a user's mobile device or vehicle. The pre-trip offer may be based upon driver or passenger profiles, current conditions (such as current weather, road conditions, time of day, time of year, distance, vehicle attributes, and other or surrounding vehicles), and/or number of passengers.

If two or more people are traveling in the vehicle, the system may determine, based upon the current conditions and driving profiles, which person is the safest or most risk averse driver given the current conditions, and generate a recommendation and/or an insurance discount if the safest driver (e.g., husband or wife) drives the vehicle for the given trip.

Additionally or alternatively, legs of a trip may be analyzed along with changing current conditions. A specific driver may be identified as having the lowest risk associated with driving the vehicle for a given leg. A recommendation and/or discount may be presented to the vehicle occupants if the lowest risk driver drives for each individual leg of the trip. As a result, less hard braking may occur, and less maintenance to the vehicle may be needed if the lowest risk driver drives the vehicle a majority of the time.

Pre-trip or post-trip cost sharing may also be provided. For instance, expenses for gas, vehicle operation or mileage, tires, maintenance, tolls, parking tickets, and/or taxes may be split between vehicle occupants. The vehicle itself may be interconnected and/or "smart," and be capable gf electronically transferring funds between driver and passenger financial accounts. In other words, the vehicle itself, and/or mobile devices, may operate as payment devices to share costs associated with vehicle operation.

Also, the present embodiments may facilitate matching those persons in the market for a new vehicle with the safest vehicle for them given their driving and/or passenger profile. Discounts on auto insurance may be provided to those that follow recommendations, and purchase vehicles recommended to them based upon their driving and/or passenger profile.

Exemplary Interconnectivity

FIG. 1 illustrates a block diagram of an exemplary interconnected wireless communication system 100 on which the methods described herein may be implemented. The communication system 100 may generally be divided into front-end components 102 and back-end components 104, both of which may include hardware and software applications, as well as various data communications channels for communicating data between the various hardware and software components. The front-end components 102 may generate or collect locationing data from mobile device-mounted sensors, vehicle-mounted sensors, smart infrastructure-mounted sensors, wearable electronics-mounted sensors, other sensors, or from vehicle systems, such as a sound system (e.g., speaker system 124).

Examples of locationing data include occupancy data that describes passengers or other objects in a vehicle (e.g., identities of the passengers, age of the passengers, the number of passengers presently in the vehicle, the number of passengers that have entered or left a vehicle over a period of operation of the vehicle, the length of time a passenger was inside the vehicle, etc.) and mobile device identification data (e.g., the geographical location of the mobile device of the driver or the geographical location of the mobile devices of passengers within the vehicle, which collectively is referred to or interchangeably referred to as geolocating of mobile devices).

The front-end components 102 may also generate or collect driving performance data (both actual and historical) from mobile device-mounted sensors, vehicle-mounted sensors, smart infrastructure-mounted sensors, wearable electronics-mounted sensors, or other sensors. The driving performance data may be in the form of vehicle data, vehicle collision data, geographic location data (e.g., GPS data), telematics data (e.g., vehicle load weight, planned vehicle route, travelled vehicle route, travel route patterns taken by the vehicle, distance that the vehicle is estimated to or has traveled, vehicle configuration, vehicle fuel consumption, vehicle fuel level, tire pressure, vehicle suspension tuning setting, vehicle control), mobile device data, vehicle-mounted sensor data (e.g., on-board diagnostics may indicate the transmission mode the vehicle is in, such as automatic or manual mode), auto insurance claim data, autonomous vehicle data (e.g., whether autonomous navigation settings have been engaged), smart infrastructure sensor data, image data, or other data.

Accordingly, the locationing data and driving performance data may provide contextual information of the vehicle 108 (e.g., a car, truck) related to occupancy within the interior of the vehicle, traffic, vehicle damage, extent of injuries at a vehicle collision, number and identification of vehicles involved, dates and times of vehicle use, duration of vehicle use, mobile device GPS location, vehicle GPS location, speed, RPM or other tachometer readings of the vehicle, lateral and longitudinal acceleration of the vehicle, environment (e.g., construction, accidents in the area, weather, road condition), or other information relating to use of the vehicle 108. The locationing data and driving performance data may be collected before, during, and/or after a period of operation of the vehicle.

Front-end components 102 may include on-board computer 114, mobile device 110 (e.g., a smart phone, a cellular phone, a tablet computer, a special purpose or general use computing device, smart watch, wearable electronics such as augmented reality appliance, vehicle navigation device, dedicated vehicle monitoring or control device, and the likes), one or more sensors 120 associated with vehicle 108, and a communication component 122. The on-board computer 114 may be a general-use on-board computer capable of performing many functions relating to vehicle operation or a dedicated computer for autonomous vehicle operation. Further, the on-board computer 114 may be originally installed by the manufacturer of the vehicle 108, or installed as an aftermarket modification or addition to the vehicle 108.

Examples of sensors 120, which may collect or generate the locationing data and driving performance data, include a GPS unit, a digital camera, a video camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, and an inductance sensor. For instance, sensors 120, such as cameras, microphones, pressure sensors, thermometers, seat sensors, or similar sensors, may actively or passively scan the interior or passenger compartment of the vehicle 108 to monitor the vehicle operator (e.g., driver) and/or passengers within the vehicle 108, and to generate or collect occupancy data.

Other sensors 120 (e.g., GPS, accelerometer, or tachometer units) may provide data for determining the location or movement of the vehicle 108, or the location of the mobile devices 110 inside the vehicle 108. The sensors 120 may be positioned to determine telematics data regarding the speed, force, heading, and/or direction associated with movements of the vehicle 108. Some of the sensors 120 (e.g., radar, LIDAR, or camera units) may actively or passively scan the vehicle environment for obstacles (e.g., other vehicles, buildings, pedestrians, etc.), roadways, lane markings, signs, or signals. Regardless of embodiment, the sensors 120 may be removably or fixedly incorporated within or connected to the on-board computer 114 or the mobile device 110 and may be disposed in various arrangements.

The on-board computer 114 or mobile device 110 may each be configured to execute one or more algorithms, programs, or applications to generate, collect, or analyze the locationing data and driving performance data from one or more sensors 120 within the vehicle 108. The mobile device 110 or on-board computer 114 may be integrated into a single device, and in other embodiments, may be separate devices. For example, the on-board computer 114 or mobile device 110 may process the locationing data to determine configuration information concerning the interior of the vehicle 108, such as whether a seat is occupied by a person or object, or the locations of other mobile devices 110, during a period of vehicle operation. In such embodiments, the on-board computer 114 or mobile device 110 may further process the locationing data (e.g., occupancy data or mobile device identification data) to determine that the vehicle 108 was in service of a TNC company during the period of operation (e.g., if the configuration information suggests that TNC passengers, or their mobile devices, have entered or left the vehicle over the period of operation).

As another example, the on-board computer 114 or mobile device 110 may each be configured to execute one or more algorithms, programs, or applications to generate, collect, or analyze the driving performance data (both present and historical), which may indicate whether the vehicle 108 is in a period of use, whether vehicle 108 is operated manually or autonomously while the vehicle 108 is in use, whether vehicle 108 travelled a route pattern indicative of TNC trips, and whether the period of use of vehicle 108 includes TNC trips. In such embodiments, if vehicle 108 is an autonomous vehicle, the on-board computer 114 or mobile device 110 may collect data related to the autonomous features to assist the vehicle operator in operating the vehicle 108.

In some embodiments, the mobile device 110 may supplement the functions performed by the on-board computer 114 described herein. In other embodiments, the on-board computer 114 may perform all of the functions of the mobile device 110 described herein, in which case no mobile device 110 may be present in the system 100. Additionally, the mobile device 110 and on-board computer 114 may communicate with one another directly over link 116 or indirectly over multiple radio links.

In preferred embodiments, the mobile device 110 or on-board computer 114 may communicate with a speaker system 124 of the vehicle 108 over radio link 116, utilizing a short-range communication protocol, such as Bluetooth, for instance. The speaker system 124 may include an array of speakers disposed inside the vehicle 108. The mobile device 110 or on-board computer 114 may transmit a locationing pulse request to the speaker system 124 over radio link 116, such as a short-range communication protocol (e.g., Bluetooth). The locationing pulse request may include a request for the speaker system 124 to emit a locationing pulse.

In some embodiments, the mobile device 110 or on-board computer 114 may be triggered to transmit the locationing pulse request. For example, a server communicatively coupled to the mobile device 110 or on-board computer 114, such as server 140 described below, may first receive, from the mobile device 110 or on-board computer 114, information that indicates that the mobile device 110 or on-board computer 114 and vehicle 108 are configured to communicate over a short-range communication protocol, such as Bluetooth. Accordingly, the server 140, via a vehicle occupancy evaluator application, may determine that mobile device 110 or on-board computer 114 is present inside the vehicle 108. The server may then, via the vehicle occupancy evaluator application, generate and/or transmit the location pulse request to the mobile device 110 or on-board computer 114, which may in turn transmit the locationing pulse request to the speaker system 124 over radio link 116, as described above.

In response to receiving the locationing pulse request, the speaker system 124 may emit a locationing pulse to the interior of vehicle 108. The locationing pulse, such as a discrete audio signal, may be emitted from the speaker system 124 in a frequency band outside an audible frequency range of humans. Mobile device 110 associated with the driver or any passengers in the vehicle may receive/detect the locationing pulse via a microphone of the mobile device 110, for example. The mobile device 110 may process the locationing pulse and further determine configuration information (e.g., locationing data) concerning the interior of the vehicle 108, such as whether a seat is occupied by a person or object, detecting passengers that have entered or left the vehicle over a period of operation of the vehicle, whether one or more non-driver passengers were inside the vehicle for part of the period of operation of the vehicle, or the locations of other mobile devices 110. For example, the mobile device 110 may compare the locationing pulse emitted from the speaker system 124 (a pre-defined sequence of high frequency sound components) with the received/detected locationing pulse. The presence of passengers or objects in the vehicle 108 may alter the sequence of high frequency sound components as the locationing pulse propagates from the speaker system 124 to the mobile device 110. The differences may be analyzed to evaluate the configuration information concerning the interior of the vehicle 108.

Another way for the mobile device 110 to process the locationing pulse and further determine configuration information (e.g., locationing data) concerning the interior of the vehicle 108 may be to measure time of signal arrival techniques. For example, given that a front left and front right speaker is present in the vehicle 108, to measure whether a passenger is present in the passenger seat, the mobile device 110 or on-board computer 114 may transmit the locationing pulse request to the speaker system 124 (i.e., front left and front right speakers), the mobile device 110 or on-board computer 114 may record the locationing pulse emitted from the speaker system 124, and the recorded sound may be processed by the mobile device 110 or on-board computer 114 to measure the delay between the locationing pulse output emitted from the front left and front right speakers.

In some embodiments, the mobile device 110 or on-board computer 114 may determine an identity associated with each of the non-driver passengers if they are present inside the vehicle for part of the period of operation of the vehicle. For example, wireless communication between mobile devices associated with the non-driver passengers and the mobile device 110 or on-board computer 114 may facilitate identity sharing, particularly when the mobile device 110 or on-board computer 114 receives a transmission from mobile devices associated with the non-driver passengers. Each of the mobile devices associated with the non-driver passengers may include an application stored on the respective mobile device that is associated with the identity of the non-driver passenger, and the transmission of the identity from the application may indicate that one or more of the non-driver passengers was present in the vehicle during part of the vehicle's period of operation.

As another example, the mobile devices associated with the non-driver passengers may receive, via its microphones, the locationing pulse emitted from the speaker system 124. Subsequent to receiving the locationing pulse, each of the mobile devices associated with the non-driver passengers may be triggered to transmit the identity of the non-driver passenger to the mobile device 110 or on-board computer 114 via wireless communication.

The on-board computer 114 or mobile device 110 may also be configured to communicate with the vehicle 108 utilizing a Bluetooth communication protocol, for instance. As described above, the on-board computer 114 or mobile device 110 may communicate with the speaker system 124 via a short-range communication protocol such as Bluetooth. In some embodiments, the on-board computer 114 or mobile device 110 may communicate with vehicle 108, such as via a vehicle controller (not shown), or a vehicle telephony, entertainment, navigation, or information system (not shown) of the vehicle 108 that provides functionality other than autonomous (or semi-autonomous) vehicle control.

The communication component 122 may be utilized to transmit and receive information from external sources, including other vehicles, infrastructure, smart home controllers or sensors, or the back-end components 104. To send and receive information, the communication component 122 may include a transmitter and a receiver (or transceiver) designed to operate according to pre-determined specifications, such as the dedicated short-range communication (DSRC) channel, wireless telephony, Wi-Fi, or other existing or later-developed communications protocols. The received information may supplement the data received from the sensors 120. For example, the communication component 122 may receive information that another vehicle ahead of the vehicle 108 is reducing speed, allowing for adjustments in the operation of the vehicle 108.

The front-end components 102 may communicate with the back-end components 104, such as the server 140, via a network 130. As such, the back-end components 104, such as the server via the vehicle occupancy evaluator application, may receive locationing data (including occupancy data and mobile device identification data), driving performance data, or both, that was collected by the front-end components 102. The on-board computer 114 and mobile device 110 may be configured to send the locationing data, driving performance data, or both to and/or receive data from network 130 using one or more suitable communication protocols, such as a Wi-Fi direct protocol, an ad-hoc cellular communication protocol, and the likes.

Network 130 may be a proprietary network, a secure public internet, a virtual private network or some other type of network, such as dedicated access lines, plain ordinary telephone lines, satellite links, cellular data networks, or a combination thereof. Network 130 may be implemented as a wireless telephony network (e.g., GSM, CDMA, LTE, etc.), a Wi-Fi network (e.g., via one or more IEEE 802.11 Standards), a WiMAX network, a Bluetooth network, and the likes. The network 130 may include one or more radio frequency communication links, such as wireless communication links 112 and 118 with the mobile device 110 and on-board computer 114, respectively. Where the network 130 comprises the Internet, data communications may take place over the network 130 via an Internet communication protocol.

Server 140 may receive or collect locationing data, driving performance data, or both from the front-end components 102 via the network 130, store the received data in database 146 or program memory 160, and process the received data. For example, server 140 may determine that a vehicle is in a period of use, or determine whether the vehicle is operated manually or autonomously while the vehicle is in use, based upon the driving performance data. Server 140 may further determine whether the period of use of the vehicle includes TNC trips based upon the locationing data (e.g., occupancy data). As another example, server 140 may recognize route patterns of the vehicle that are indicative of TNC trips based upon both the locationing data and driving performance data. The server 140 may also communicate information associated with the received or processed data back to the front-end components 102.

The server 140 may comprise a controller 155 that is operatively connected to the database 146 via a link 156. The controller 155 may also be operatively connected to the network 130 via a link 135. The controller 155 may include a program memory 160, a processor 162, a random-access memory (RAM) 164, and an input/output (I/O) circuit 166, all of which may be interconnected via an address/data bus 165. Similarly, the memory of the controller 155 may include multiple RAMs 164 and multiple program memories 160. The RAM 164 and program memory 160 may be implemented as semiconductor memories, magnetically readable memories, or optically readable memories, for example.

The program memory 160 may store various software applications, which may include the vehicle occupancy evaluator application 142, a vehicle cost assessor application 143, and a vehicle cost balancer application 144. The vehicle occupancy evaluator application 142 may receive locationing data (including occupancy data and mobile device identification data), driving performance data, or both, that was collected by the front-end components 102, and subsequently determine a vehicle occupancy profile based upon the received data. Because the received data may include data associated with non-driver passengers, the vehicle occupancy profile may include data associated with both the driver and non-driver passengers. The vehicle occupancy profile may include data indicative of whether the period of use of the vehicle includes TNC trips based upon the locationing data (e.g., occupancy data), and may also include route patterns of the vehicle that are indicative of TNC trips based upon both the locationing data and driving performance data.

The vehicle cost assessor application 143 may assess a cost of the operation of the vehicle during a period of operation based upon the vehicle occupancy profile. The cost may be based upon the locationing data (e.g., occupancy data), driving performance data, and telematics data, such as vehicle load weight, planned vehicle route, vehicle configuration, vehicle fuel consumption, vehicle fuel level, tire pressure, and vehicle suspension tuning settings. The vehicle cost balancer application 144 may further generate and/or transmit a cost share request to the mobile device 110 or on-board computer 114 of the vehicle 108 based upon the cost of the operation of the vehicle as determined by the vehicle cost assessor application 143.

The cost share request may be for one or more of the non-driver passengers or the driver based upon the vehicle occupancy profile, or even to an entity not associated with the vehicle occupancy profile, to pay for part of the cost of operation of the vehicle during the period of operation. The vehicle cost balancer application 144 may determine the cost of operation of the vehicle based upon the distance (e.g., mileage) traversed during the period of operation of the vehicle, based upon a length of time that the one or more non-driver passengers occupied the vehicle during the period of operation, and/or based upon insurance costs including usage based insurance pricing, which may be based upon insurance coverage associated with the vehicle occupancy profile during the operation of the vehicle (e.g., prorated insurance costs according to a length of time a passenger was inside the vehicle during the period of operation).

The cost share request may include a request for the identities of non-driver passengers, or a request for the identity of a reimbursing entity. In some embodiments, the cost share request may be based upon the distance traveled by the vehicle 108 during a period of operation. Additionally or alternatively, the vehicle cost balancer application 144 may transmit a request to the mobile device 110 or the on-board computer 114 to configure receiving such cost share requests automatically.

In response to transmitting the cost share request to the mobile device 110 or on-board computer 114 of the vehicle 108, the vehicle cost balancer application 144 may receive an agreement from a mobile device associated with a non-driver passenger to pay a part of the cost of operation of the vehicle 108 during the period of operation. The agreement may include a real-time deposit of money or payment of fees. The vehicle cost balancer application 144 may also receive an identity of one or more non-driver passengers from the mobile device 110 or on-board computer 114. The various software applications may be executed by the same computer processor 162 or by different computer processors.

In some embodiments, one or more portions of the server 140 may be implemented as one or more storage devices that are physically co-located with server 140, or as one or more storage devices utilizing different storage locations as a shared database structure (e.g. cloud storage). In some embodiments, server 140 may be configured to perform any suitable portion of the processing functions remotely that have been outsourced by mobile device 110 or the on-board computer 114. For example, mobile device 110 may collect driving performance data or locationing data as described herein, but may send the driving performance data or locationing data to server 140 for remote processing by the server 140 instead of processing the driving performance data or locationing data locally. In other embodiments, the mobile device 110 may both collect and process driving performance data or locationing data without the server 140.

Regardless of embodiment, the driving performance data or locationing data may be processed to determine the vehicle occupancy profile for the vehicle 108 based upon the locationing data (e.g., occupancy data) and/or driving performance data, which includes profile information for the driver and non-driver passengers in the vehicle 108. In some preferred embodiments, the server 140 may subsequently transmit a cost share request to the mobile device 110 or the on-board computer 114 based upon the vehicle occupancy profile. For instance, the recommendation may be for one or more non-driver passengers to pay part of the cost of operation of the vehicle when route patterns of the vehicle are indicative of TNC trips.

In some embodiments, the server 140 may be part of an insurer computing system (or facilitate communications with an insurer computer system), and as such, may access insurer databases as needed to perform insurance-related functions. Accordingly, data received from mobile device 110 or on-board computer 114 may include user credentials, which may be verified by server 140 or one or more other external computing devices or servers. These user credentials may be associated with an insurance profile and/or the vehicle occupancy profile, which may include, for example, financial account information, insurance policy numbers, a description and/or listing of insured assets, vehicle identification numbers of insured vehicles, addresses of insured users, contact information, premium rates, discounts, and the likes. In this way, data received from mobile device 110 or on-board computer 114 may allow server 140 to uniquely identify each insured customer.

In addition, server 140 may facilitate the communication of the updated insurance policies, premiums, rates, discounts, and the likes to their insurance customers for their review, modification, and/or approval. Such updated information may include an endorsement or adjustment to an insurance agreement if the policy for example covers or insures TNC trips. The server 140 (or the insurer computing system that includes the server 140) may generally detect whether a trip is likely to be a TNC trip to determine risk associated with insuring a vehicle, using the locationing data and/or driving performance data received from the front-end components 102 (e.g., on-board computer 114 and mobile device 110) via the network 130. Therefore, and advantageously, TNC trips may be detected, and the risk of insuring a driver who makes TNC trips may be more accurately determined.

Although the system 100 is shown to include one vehicle 108, one mobile device 110, one on-board computer 114, and one server 140, it should be understood that additional vehicles 108, mobile devices 110, on-board computers 114, and/or servers 140 may be utilized. For example, the system 100 may include a plurality of servers 140 and hundreds of mobile devices 110 or on-board computers 114, all of which may be interconnected via the network 130. Multiple mobile devices 110 belonging to the driver, non-TNC passengers, and/or TNC passengers may be within vehicle 108. For example, servers 140 may be dedicated for receiving each of the various types of data (e.g., locationing data and/or driving performance data) described above.

Furthermore, the database storage or processing performed by the one or more servers 140 may be distributed among a plurality of servers 140 in a cloud computing arrangement. This configuration may provide various advantages, such as enabling near real-time uploads and downloads of information, as well as periodic uploads and downloads of data or information. This may in turn support a thin-client embodiment of the mobile device 110 or on-board computer 114 discussed herein.

Exemplary Computer System

Figure 2:
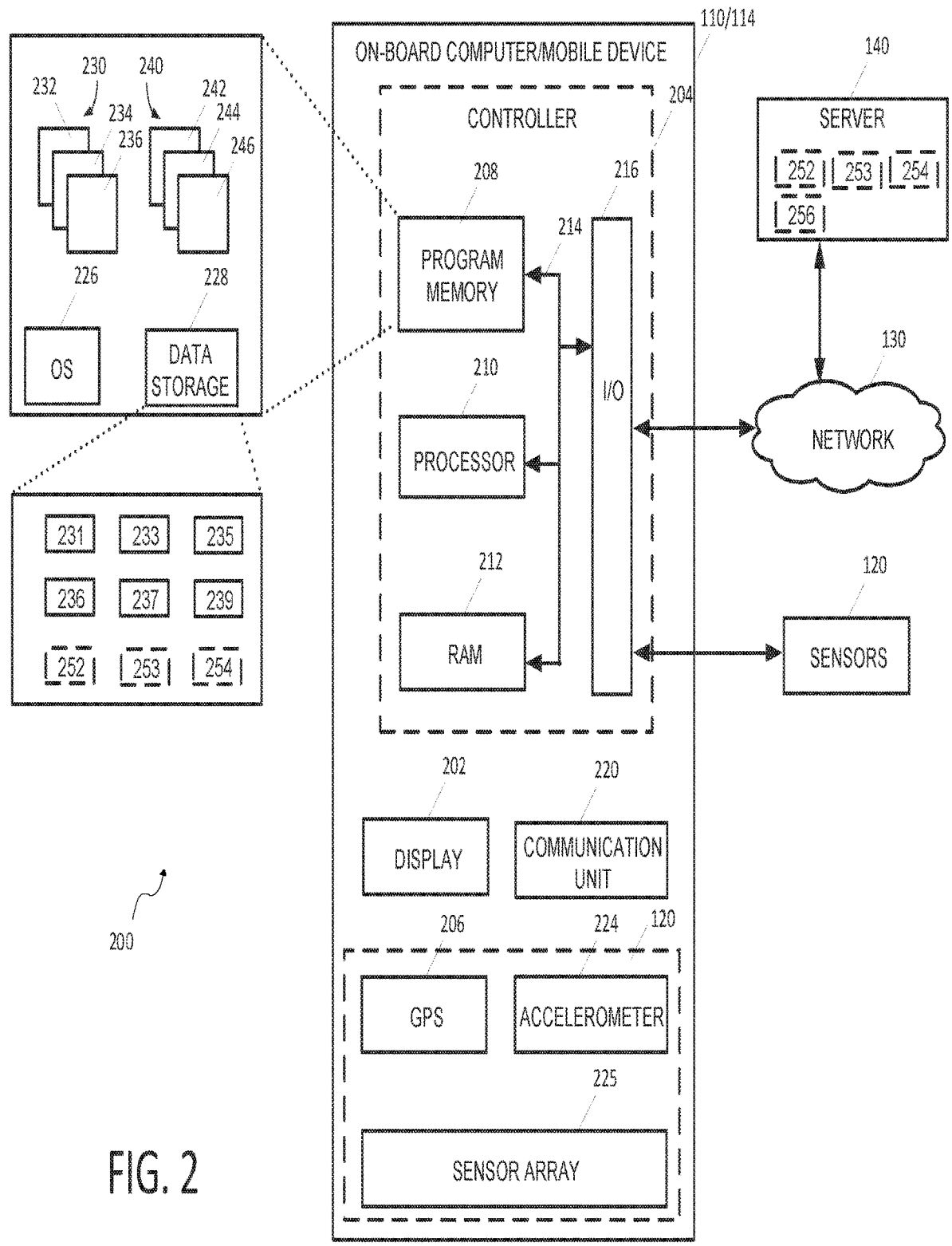
FIG. 2 illustrates a block diagram of an exemplary system that may be useful in carrying out the implementations of a system according to one embodiment.

FIG. 2 illustrates a block diagram of an exemplary computer system 200 including mobile device 110 or an on-board computer 114 and server 140 consistent with the system 100 of FIG. 1. The mobile device 110 or on-board computer 114 may include a display 202, a controller 204, a GPS unit 206, a communication unit 220, an accelerometer 224, a sensor array 225 (e.g., one or more cameras, accelerometers, gyroscopes, magnetometers, barometers, thermometers, proximity sensors, light sensors, Hall Effect sensors, radar units, or any of the sensors 120 or the likes described above) and one or more user-input devices (not shown), such as a keyboard, mouse, microphone, or any other suitable user-input device. The communication unit 220 may provide input signals to the controller 204 via the I/O circuit 216, and may also transmit sensor data, device status information, control signals, or other output, which include locationing data and/or driving performance data, from the controller 204 to one or more external sensors within the vehicle 108 or server 140.

Similar to the controller 155 of FIG. 1, the controller 204 may include a program memory 208, one or more processors 210 (e.g., microcontrollers or microprocessors), a RAM 212, and the I/O circuit 216, all of which are interconnected via an address/data bus 214. The program memory 208 may include an operating system 226, a data storage 228, a plurality of software applications 230, and/or a plurality of software routines 240. The operating system 226, for example, may include one of a plurality of general purpose or mobile platforms, such as the Android™, iOS®, or Windows® operating systems. Alternatively, the operating system 226 may be a custom operating system designed for vehicle operation using the on-board computer 114.

The data storage 228 may include data such as user profiles and preferences, application data for the plurality of applications 230, routine data for the plurality of routines 240, and other data related to determining the interior or passenger compartment of the vehicle 108 to monitor the vehicle operator (e.g., driver) and/or passengers within the vehicle 108, road navigation and/or vehicle operation features. In some embodiments, the controller 204 may also include, or otherwise be communicatively connected to, other data storage mechanisms (not shown), such as hard disk drives, optical storage drives, or solid state storage devices located within the vehicle 108.

As discussed with reference to the controller 155, it should be appreciated that although FIG. 2 depicts only one processor 210, the controller 204 may include multiple processors 210. Processor 210 maybe configured to execute any of one or more of the plurality of software applications 230 or any one or more of the plurality of software routines 240 residing in the program memory 208, in addition to other software applications. Similarly, the controller 204 may include multiple RAMs 212 and multiple program memories 208. RAM 212 and program memory 208 may be semiconductor memories, magnetically readable memories, or optically readable memories, for example.

As discussed with reference to the program memory 160 in FIG. 1, data storage 228 may store various software applications 230 implemented as machine-readable instructions, which may include a vehicle occupancy evaluator application 232, a vehicle cost assessor application 234, and a vehicle cost balancer application 236. The vehicle occupancy evaluator application 232 may receive locationing data (including occupancy data and mobile device identification data), driving performance data, or both, that was collected by the front-end components 102, and subsequently determine a vehicle occupancy profile based upon the received data. The vehicle cost assessor application 234 may assess a cost of the operation of the vehicle during a period of operation based upon the vehicle occupancy profile. The vehicle cost balancer application 236 may further generate and/or transmit a cost share request to the mobile device 110 or on-board computer 114 of the vehicle 108 based upon the cost of the operation of the vehicle as determined by the vehicle cost assessor application 234.

The various software applications may be executed by the same computer processor 210 or by different computer processors. The various software applications 230 may call various software routines 240, such as vehicle occupancy evaluator routine 242, a vehicle cost assessor routine 244, and/or a vehicle cost balancer routine 246 to execute the various software applications 230.

In addition to applications and routines, the data storage 228 may store various data, such as expected passengers data 231, observed passengers data 233, TNC risk index data 235, expected travel route data 236, observed travel route data 237, and/or notification data 239. In one embodiment, the data storage 228 may include one or more of driving performance data 252, locationing data 253, and/or claims data 254. In other embodiments, driving performance data 252, locationing data 253, and/or claims data 254 may be stored in database 146 managed by server 140.

Expected passengers data 231 represents historical data characteristics of non-TNC trip passengers and/or TNC trip passengers. The expected passengers data 231 may include data representing characteristics of non-TNC trip passengers and/or TNC trip passengers that may be expected for any one or more of the following: a particular area of traffic (e.g., an intersection, street, portion of a street, parking lot, and the likes), a particular time, such as the time of year (e.g., a particular date, month, and/or season), a day of the week (e.g., Sunday-Saturday), a time of day (e.g., a particular time or a general time, such as "evening" or "morning"), a volume of traffic (e.g., a number of cars per hour), and the likes.

Expected passengers data 231 may also represent historical data characteristics of non-TNC trip passengers and/or TNC trip passengers that have been collected in recent history (e.g., in the last month, the last few months, the last year, the last few years, and the likes). For example, historical data characteristics of non-TNC trip passengers may indicate that a passenger remained in a seat of the vehicle during the entire non-TNC trip, which may be measured by a seat sensor producing a constant signal. Similarly, historical data characteristics of TNC trip passengers may indicate that different passengers sat in a seat of the vehicle during the entire non-TNC trip, which may be measured by a seat sensor producing an irregular signal. Expected passengers data 231 may be tracked specific to the driver of vehicle 108, or may be a generic data set.

Observed passengers data 233 represents data characteristics of non-TNC trip passengers and/or TNC trip passengers of trips that actually occurred within a certain area for the vehicle 108. The observed passengers data 233 may also represent policy holders (e.g., the driver and/or passengers) associated with a particular insurance company, or may represent policy holders associated with multiple companies.

Similarly, expected travel route data 236 represents historical data characteristics of non-TNC trips and/or TNC trips. The expected travel route data 236 may include data representing characteristics of non-TNC trips and/or TNC trips that may be expected for any one or more of the following: a particular area of traffic (e.g., an intersection, street, portion of a street, parking lot, and the likes), a particular time, such as the time of year (e.g., a particular date, month, and/or season), a day of the week (e.g., Sunday-Saturday), a time of day (e.g., a particular time or a general time, such as "evening" or "morning"), a volume of traffic (e.g., a number of cars per hour and the likes.

Expected travel route data 236 may also represent historical data characteristics of non-TNC trips and/or TNC trips that have been collected in recent history (e.g., in the last month, the last few months, the last year, the last few years, and the likes). For example, historical data characteristics of non-TNC trips may indicate an established travel route that has been driven more than a pre-determined amount of times (e.g., 30).

Figure 8:
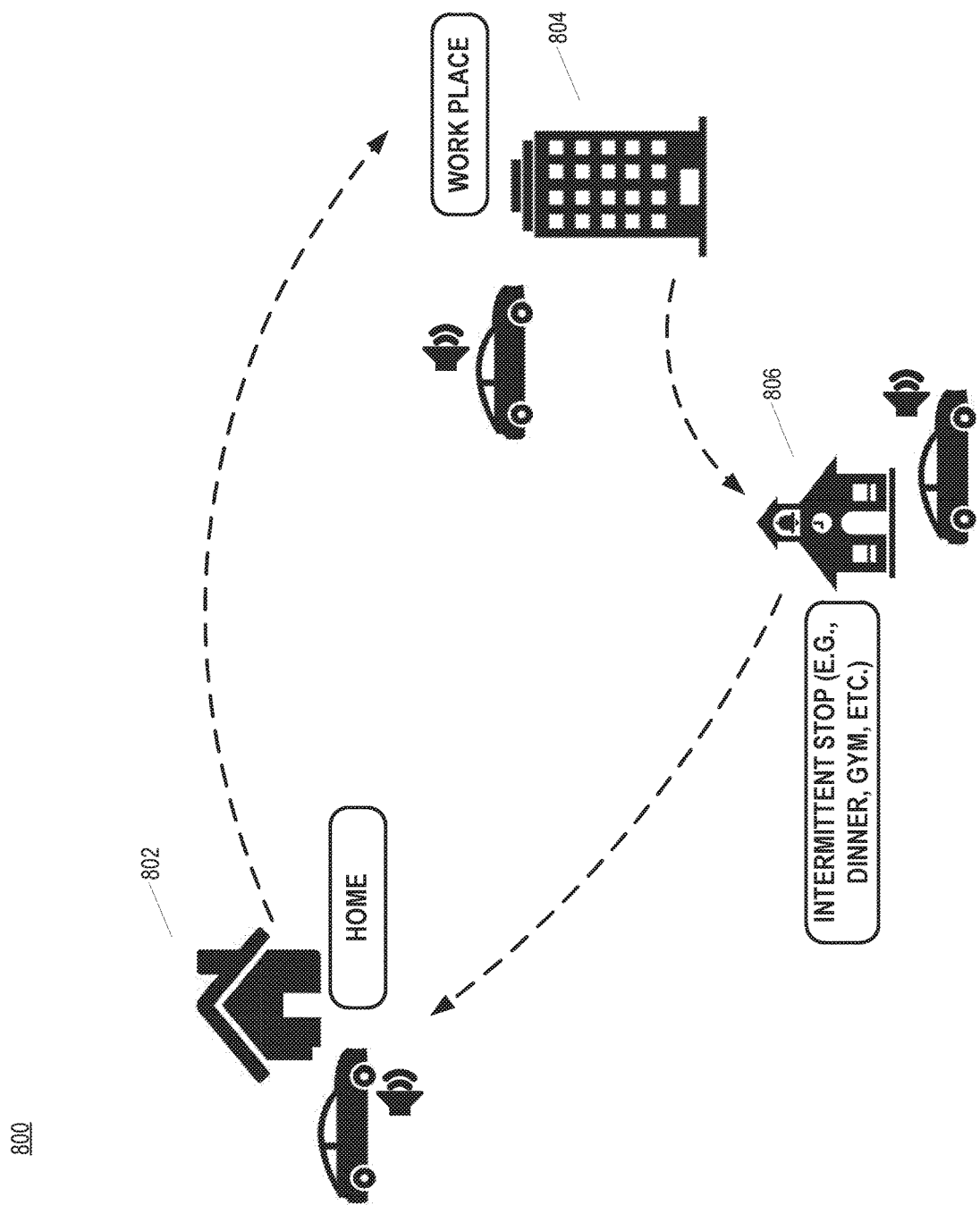
FIG. 8 illustrates an exemplary travel route of a non-TNC trip.

Such travel routes, such as the travel route 800 depicted in FIG. 8, may begin at a driver's home 802, end at the driver's home 802, and have routine stops in between, such as at the driver's work place 804 and other routine places 806, such as the grocery store, restaurant, etc. The frequent routine stops may be indicated in the telematics data measured by the various sensors 120.

Figure 9:
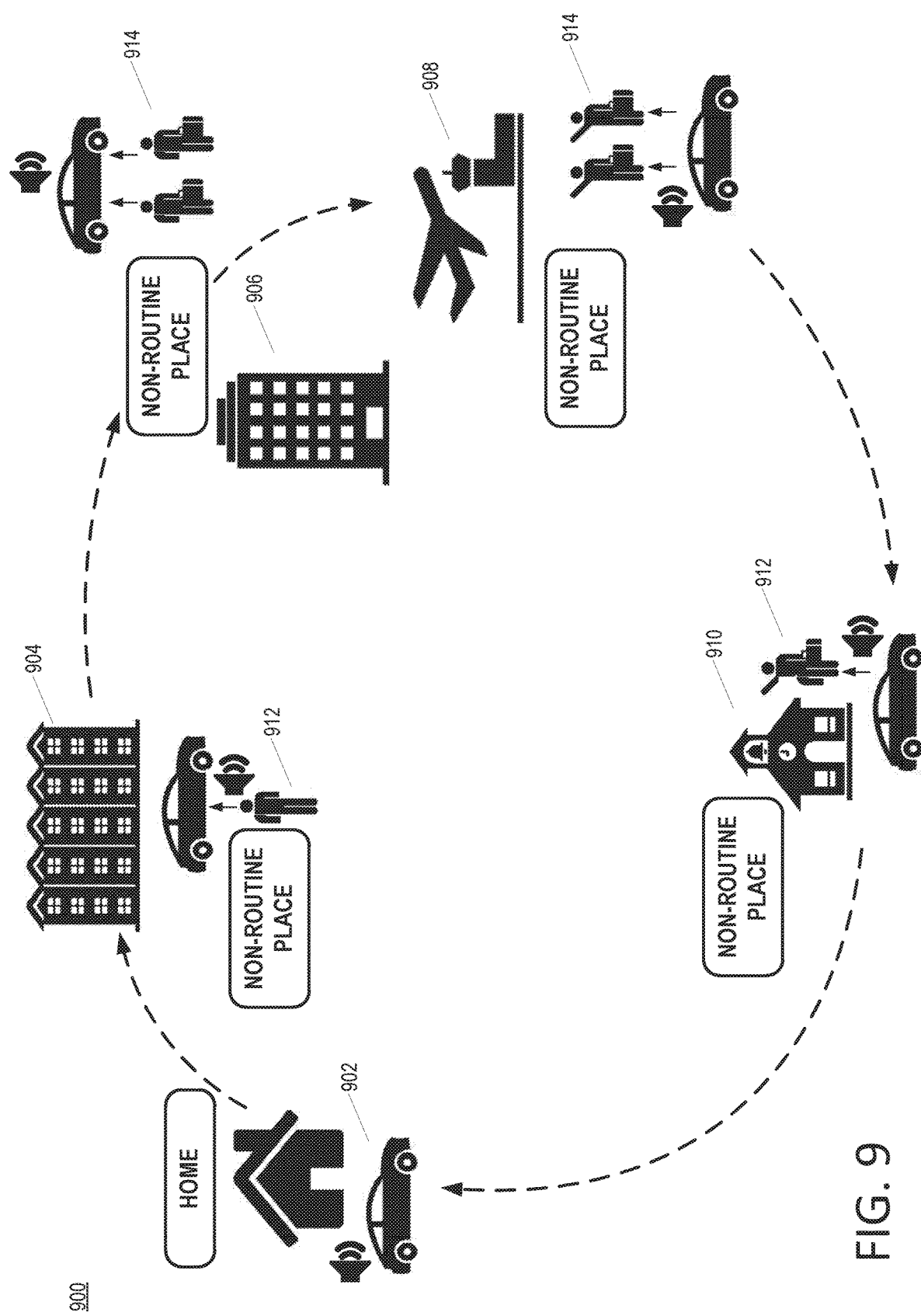
FIG. 9 illustrates an exemplary travel route of a TNC trip.

Similarly, historical data characteristics of TNC trips may indicate a unique travel route that has not been driven frequently, or less than a pre-determined amount of times (e.g., 2). Such travel routes, such as the travel route 900 depicted in FIG. 9, may begin at a driver's home 902, end at a driver's home 902, and have numerous stops (e.g., more than 10) in between at non-routine places (i.e., destinations of TNC passengers), which may be indicated in the telematics data measured by the various sensors 120.

For example, the driver may pick up passenger 912 at a non-routine place 904, pick up two additional passengers 914 at another non-routine place 906, drop off the two additional passengers 914 at a non-routine place 908, and lastly drop off passenger 912 at non-routine place 910. The stops of such a TNC trip should coincide with a TNC passenger either entering or exiting a vehicle, and as such, the timing of changes in telematics data (e.g., a change in vehicle load weight) may coincide with the timing of changes in an irregular signal produced by a seat sensor, for example. Expected travel route data 236 may be tracked specific to the driver of vehicle 108, or may be a generic data set. Observed travel route data 237 represents data characteristics of non-TNC trips and/or TNC trips that actually occurred within a certain area for the vehicle 108.

Referring back to FIG. 2, in some embodiments, the processor 210 generates or collects some or all of the expected passengers data 231, observed passengers data 233, expected travel route data 236, and observed travel route data 237 based upon the driving performance data 252, locationing data 253, and/or the claims data 254 that are gathered from various sources, such as vehicle 108, sensors 120, and server 140. Claims data 254 may provide supplemental information as to the frequency of vehicle collisions for example, and more specifically, the frequency of vehicle collisions during non-TNC trips, TNC trips, as well as to personnel involved in vehicle collisions, such as non-TNC trip passengers and/or TNC trip passengers for example. As will be described herein, claims data 254 may also be used to determine a TNC risk index for a particular trip.

Claims data 254 may be associated with actual insurance claims arising from real world vehicle collisions, such as data scrubbed of personal information, or otherwise de-identified auto insurance claim data. Claims data 254 generally represents insurance claims filed by insurance policy owners. The claims data 254 may identify a particular collision, the travel route that led to the particular collision, passengers that were in the vehicle at the time of the particular collision, policy owners, other involved vehicles, a location where the collision occurred, property involved, repair and/or replacement costs and/or estimates, a time and date of the collision, and/or various other information.

In one embodiment, actual claim images (such as mobile device images of damaged vehicles, or images acquired via vehicle-mounted cameras and/or sensors) may be analyzed to associate an amount of physical damage shown in one or more images of vehicles involved in a vehicle collision with a repair or replacement cost of the vehicles. The actual claim images may be used to estimate repair or replacement cost for vehicles involved in past, recent, or current vehicle collisions. The processor 210 may then analyze some or all of the expected passengers data 231, observed passengers data 233, expected travel route data 236, and observed travel route data 237 based upon the driving performance data 252, locationing data 253, and/or the claims data 254 to calculate a TNC risk index for a particular trip.

The system 200 may acquire expected travel route data 236, expected passengers data 231, and/or the claims data 254 to assess actual trips of interest. Particularly, the processor 210 may receive expected travel route data 236, expected passengers data 231, and/or the claims data 254 from server 140. In some embodiments, the processor 210 may transmit a query to server 140 managing a database in order to receive expected travel route data 236, expected passengers data 231, and/or the claims data 254 from server 140.

To assess each trip of interest, driving performance data 252 (e.g., actual data) and locationing data 253 (e.g., actual data) associated with the actual trip of interest may be received by processor 210 and/or stored in program memory 208, as observed travel route data 237 and observed passengers data 233, respectively. Subsequently, the driving performance data 252 (e.g., actual data) and locationing data 253 (e.g., actual data) associated with the actual trip of interest (or observed travel route data 237 and observed passengers data 233) may be compared against the acquired expected travel route data 236, expected passengers data 231, and/or the claims data 254. For example, acquired travel route data 236 for vehicle 108 may indicate that the vehicle 108 typically traverses a well-defined travel route, starting from the driver's home, heading to the driver's place of employment, and ending at the driver's home.

Acquired expected passengers data 231 for vehicle 108 may also indicate that the vehicle 108 typically traverses without any other passengers inside the vehicle 108. If the actual driving performance data 252 (or observed travel route data 237) associated with the actual trip of interest indicates that the vehicle 108 traversed multiple places that were never traversed historically according to the expected travel route data 236, and if the actual locationing data 253 (or observed passengers data 233) indicates that the vehicle 108 traversed those places with passengers inside the vehicle contrary to expected passengers data 231, the system 200, particularly processor 210, may assess the actual trip of interest as a TNC trip.

In other embodiments, the system 200 (e.g., the processor 210) may acquire driving performance data 252 (e.g., actual data) and locationing data 253 (e.g., actual data) associated with the actual trip of interest (e.g., from server 140 via wireless communication or data transmission over one or more radio links or wireless communication channels), and determine, solely from the driving performance data 252 and locationing data 253, whether the actual trip is a TNC trip or a non-TNC trip, and whether TNC passengers or non-TNC passengers were inside the vehicle during the trip. Additionally or alternatively, the server 140 may receive, via wireless communication or data transmission over one or more radio links or wireless communication channels, the driving performance data 252 (e.g., actual data) and locationing data 253 (e.g., actual data) associated with the actual trip of interest (or observed travel route data 237 and observed passengers data 233) from the processor 210, and subsequently compare the driving performance data 252 (e.g., actual data) and locationing data 253 (e.g., actual data) or observed travel route data 237 and observed passengers data 233 against the expected travel route data 236, expected passengers data 231, and/or the claims data 254 stored in a database associated with the server 140 to assess the actual trips of interest. In such an embodiment, the system 200, particularly server 140, may assess the actual trip of interest as a TNC trip, for example.

In some embodiments, subsequent to assessing whether the actual trip of interest is a TNC trip, the processor 210 or server 140 may next calculate a TNC risk index to evaluate risk associated with insuring a vehicle that participates in TNC trips. For example, in certain embodiments, the processor 210 or server 140 may divide the number of observed TNC trips by the number of total non-TNC and TNC trips. The processor 210 or server 140 may store the resulting quotient to the data storage 228 as TNC risk index data 235 or to a database of the server 140 as TNC risk index data 256. In such embodiments, a TNC risk index value between 0.1 and 0.3 may indicate low risk, a TNC risk index value between 0.31 and 0.6 may indicate medium risk, and a TNC risk index value between 0.61 and 0.99 may indicate high risk, for example.

In other embodiments, the TNC risk index may be calculated differently. For example, in some embodiments, the processor 210 or server 140 may calculate the TNC risk index as a count value representing the number of TNC trips counted in a pre-determinable period of time, and if the TNC risk index exceeds a pre-determinable threshold, the TNC risk index may indicate high risk. Regardless of embodiment, based upon the TNC risk index data, the process 210 or server 140 may update or adjust an auto, personal, health, life, homeowners, renters, or other insurance premium or discount to reflect risk averse behavior.

In some embodiments, subsequent to assessing that the actual trip of interest is a TNC trip, the processor 210 or server 140 may generate and send a cost share request to the mobile device of the driver or non-driver passengers. The processor 210 or server 140 may determine the identity of the driver as a party to the insurance agreement having terms regarding the TNC usage based upon an application stored in the on-board computer 114, mobile device 110, or the server 140 associated with the identity of the driver. If the server 140 generates the cost share request, it may transmit, via wireless communication or data transmission over one or more radio links or wireless communication channels, the cost share request to the processor 210.

The cost share request may be sent to the driver or non-driver passenger in response to a single TNC trip detected, in response to a plurality (e.g., exceeding a pre-determinable number) of TNC trips detected, or in response to a TNC risk index that is above a pre-determinable TNC risk index value, such as being a non-zero value or above zero in one embodiment. Because the cost share request may be sent to the driver or non-driver passenger when at least one TNC trip is detected, the cost share request may be sent effectively based upon locationing data 253 (e.g., geolocating of mobile devices within the vehicle) and/or based upon driving performance data 252 (e.g., a route pattern taken by the vehicle) associated with the actual trip of interest.

In some embodiments, the server 140 may receive various information as to whether the driver, non-driver passenger, or autonomous vehicle accepted the cost share request, upon permission by the user or settings of the autonomous vehicle. In response, the server 140 may update or adjust an auto, personal, health, life, homeowners, renters, or other insurance premium or discount to reflect risk averse behavior.

Exemplary Cost Sharing

Figure 3:
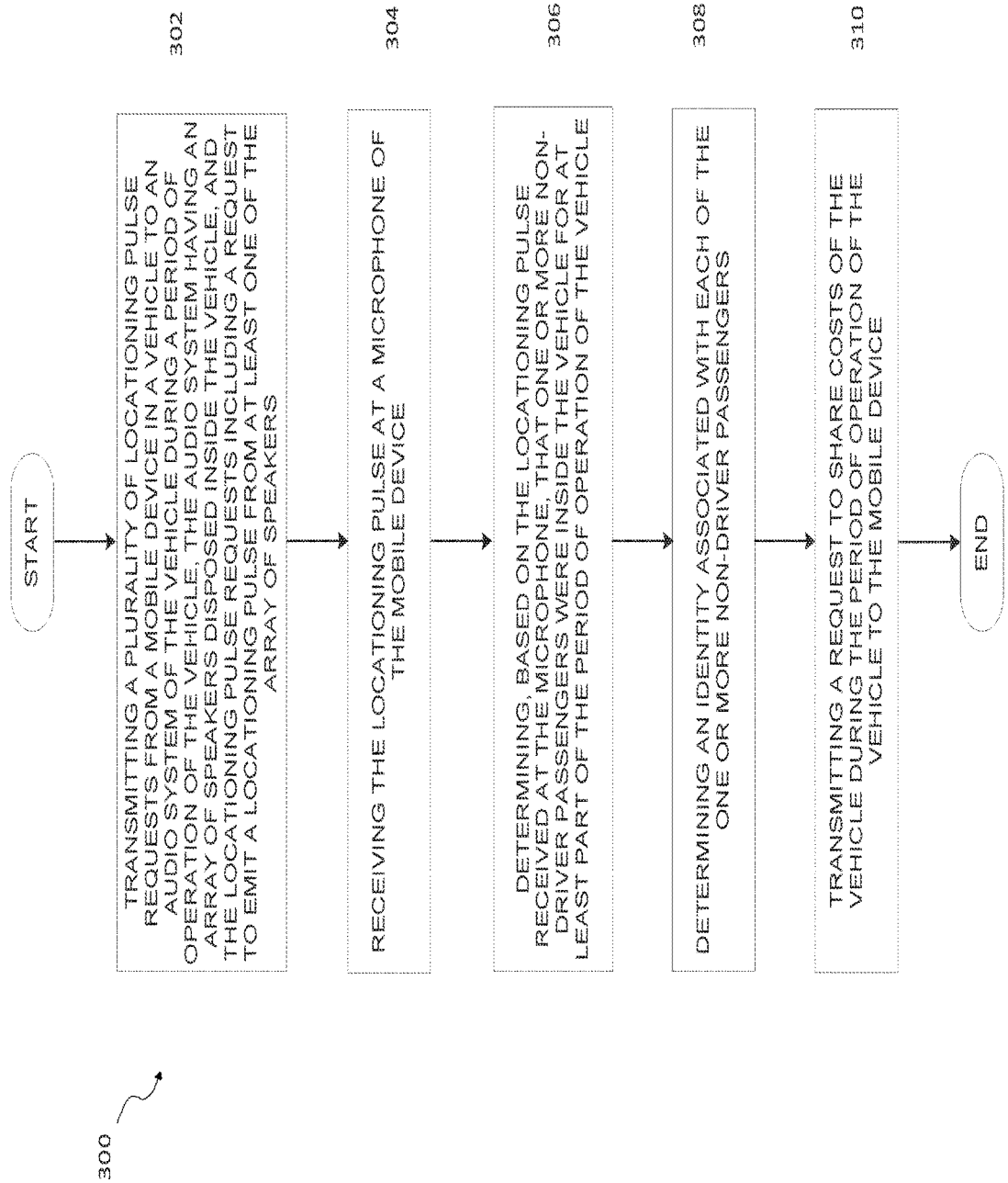
FIG. 3 illustrates an exemplary flowchart for detecting TNC trips in a vehicle according to one embodiment.

FIG. 3 illustrates an exemplary computer-implemented method 300 for transmitting a cost share request when one or more non-driver passengers are inside a vehicle during operation of the vehicle, particularly during a TNC trip for instance, according to one embodiment. The method 300 may be implemented, in whole or in part, by the systems 100 or 200 shown in FIGS. 1 and 2, implemented via one or more processors (e.g., processor 210 or processor 162), transceivers, and/or sensors 120, and/or via computer-executable instructions stored on non-transitory computer-readable medium or media. Accordingly, in some embodiments, server 140 having access to driving performance data 252, locationing data 253, and/or claims data 254 may carry out method 300. In other embodiments, on-board computer 114 or mobile device 110 having memory that stores performance data 252, locationing data 253, and/or claims data 254 may carry out method 300. The method 300 may be stored in memory (e.g., program memory 208 or other memory units) or a database (e.g., database 146) as one or more instructions or routines.

The method 300 may begin when a mobile device (e.g., mobile device 110), or alternatively, an on-board computer (e.g., on-board computer 114) in a vehicle transmits, via a short range communication protocol, such as Bluetooth, a plurality of locationing pulse requests to an audio system of the vehicle during a period of operation of the vehicle (block 302). The audio system may have an array of speakers disposed inside the vehicle. The locationing pulse requests may include a request to emit a locationing pulse from the array of speakers. The method 300 may then proceed when the mobile device or on-board computer, at the microphone, receives the locationing pulse from the array of speakers (block 304). The locationing pulse may be a discrete audio signal emitted from the array of speakers (e.g., speaker system 124) in a frequency band outside an audible frequency range of humans. The method 300 may then proceed when, in some embodiments, the mobile device or on-board computer determines, based upon the received locationing pulse, that one or more non-driver passengers were inside the vehicle for at least part of the period of operation of the vehicle (block 306).

For example, the mobile device 110 may analyze the received locationing pulse by comparing the locationing pulse emitted from the array of speakers (a pre-defined sequence of high frequency sound components) with the received/detected locationing pulse. The presence of passengers or objects in the vehicle 108 may alter the sequence of high frequency sound components as the locationing pulse propagates from the array of speakers to the mobile device. The differences may be analyzed by the mobile device or on-board computer to evaluate the configuration information (e.g., occupancy data) concerning the interior of the vehicle, and to further determine that one or more non-driver passengers were inside the vehicle for at least part of the period of operation of the vehicle.

The method 300 may, subsequent to the step described in block 306, proceed when the mobile device 110 or on-board computer 114 determines an identity associated with each of the non-driver passengers if they are present inside the vehicle for part of the period of operation of the vehicle (block 308). For example, wireless communication between mobile devices associated with the non-driver passengers and the mobile device 110 or on-board computer 114 may facilitate identity sharing, particularly when the mobile device 110 or on-board computer 114 receives a transmission from mobile devices associated with the non-driver passengers.

Each of the mobile devices associated with the non-driver passengers may include an application stored on the respective mobile device that is associated with the identity of the non-driver passenger, and the transmission of the identity from the application may indicate that one or more of the non-driver passengers was present in the vehicle during part of the vehicle's period of operation. As another example, the mobile devices associated with the non-driver passengers may receive, via its microphones, the locationing pulse emitted from the speaker system 124. Subsequent to receiving the locationing pulse, each of the mobile devices associated with the non-driver passengers may be triggered to transmit the identity of the non-driver passenger to the mobile device 110 or on-board computer 114 via wireless communication.

The method 300 may, subsequent to the step described in block 308, proceed when the mobile device 110 or on-board computer 114 transmits (e.g., to a display of the mobile device) a request to share costs of the vehicle during the period of operation of the vehicle to a person (e.g., the driver) associated with the mobile device (block 310). The mobile device 110 or on-board computer 114 may be triggered to transmit such a request when the mobile device or on-board computer determines that the period of operation of the vehicle included a TNC trip according to driving performance data and locationing data associated with the actual trip of interest received from the server 140.

In some embodiments, the mobile device or on-board computer may generate or display the request to the driver when the determined risk (e.g., TNC risk index) exceeds a pre-determinable threshold (including being above zero in some embodiments). The request may be in the form of an audible, visual, or haptic alert. For example, the request may be downloaded by a driver of vehicle 108, displayed on a dashboard of the driver's vehicle, an on-board navigator of the driver's vehicle, a mobile device (e.g., mobile device 110), on-board computer (e.g., on-board computer 114) or wearable electronics device display, as depicted in FIG. 10.

Figure 10:
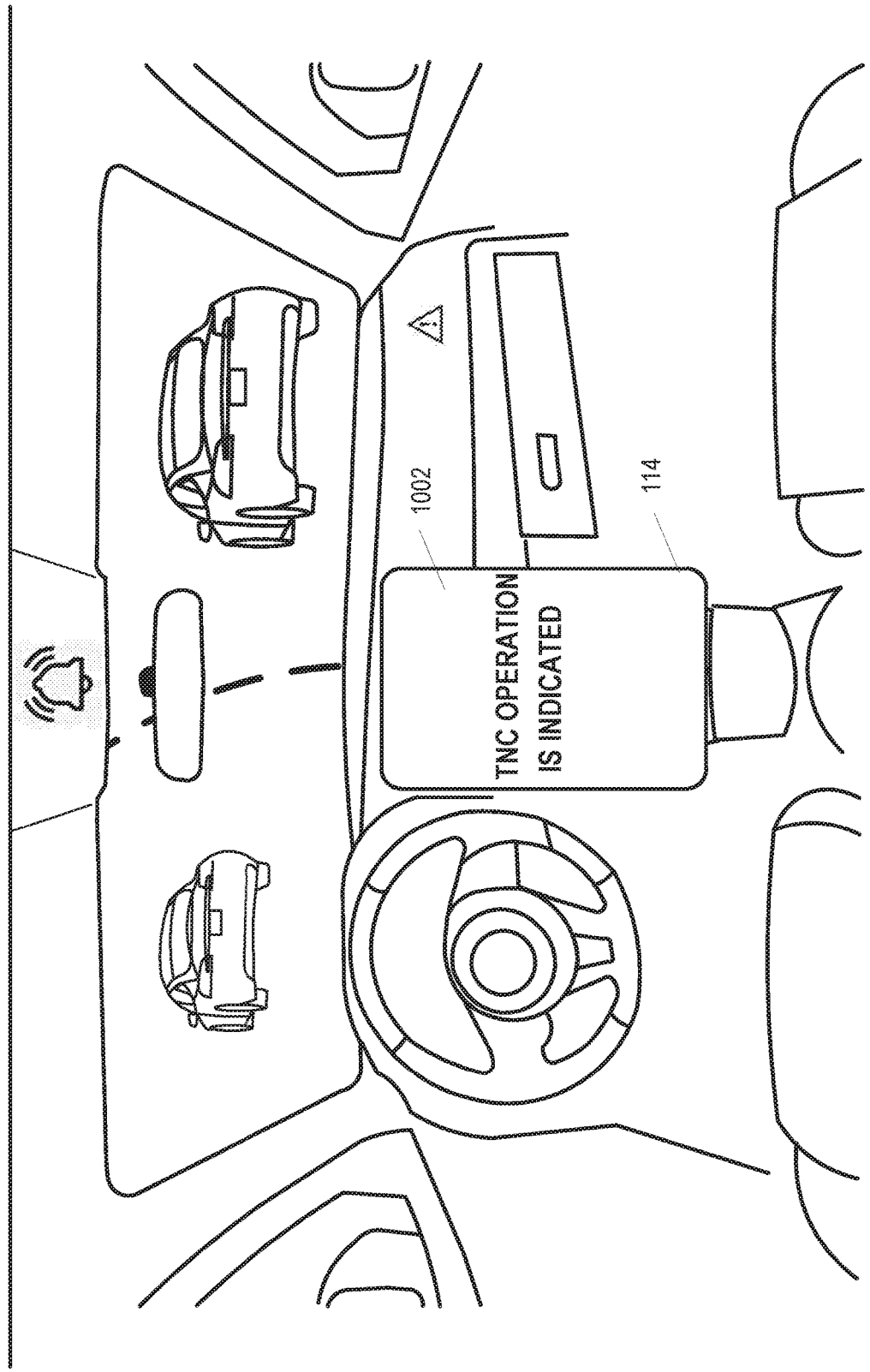
FIG. 10 illustrates an exemplary interior of a vehicle having a message displayed to a driver when a TNC trip has been detected.

As shown in FIG. 10, a request 1002 may be displayed on the on-board computer 114 of the driver's vehicle 108 that indicates that a TNC trip has been detected. In other embodiments, the request 1002 may display a message that prompts the driver to change the operation of the vehicle, such as engaging autonomous capabilities of the vehicle, in order to take advantage of premium discounts. As such, the request enables a driver to easily be put on notice when the vehicle is traversing a TNC trip, further enabling the driver to share the cost of the vehicle's operation during the TNC trip. In some embodiments, the mobile device or on-board computer may, based upon the TNC risk index, update or adjust an auto, personal, health, or other insurance premium or discount to reflect risk averse behavior.

Referring back to FIG. 3, in other embodiments, the method 300 may, subsequent to the step described in block 304, proceed when a server (e.g., server 140), based upon the received locationing pulse transmitted from the mobile device to the server, determines that one or more non-driver passengers were inside the vehicle for at least part of the period of operation of the vehicle (block 306). In this case, for example, the server 140 may analyze the received locationing pulse by comparing the locationing pulse emitted from the array of speakers (a pre-defined sequence of high frequency sound components) with the received/detected locationing pulse. The presence of passengers or objects in the vehicle 108 may alter the sequence of high frequency sound components as the locationing pulse propagates from the array of speakers to the mobile device.

In essence, upon receiving locationing data included in the locationing pulse from the mobile device (or generating the locationing data from the locationing pulse), the server may analyze the locationing data (e.g., occupancy data) to evaluate the interior of the vehicle, and to further determine that one or more non-driver passengers were inside the vehicle for at least part of the period of operation of the vehicle. The server may subsequently determine an identity associated with each of the non-driver passengers if they are present inside the vehicle for part of the period of operation of the vehicle (block 308). For instance, the mobile devices associated with each of the non-driver passengers may communicate the identity of each non-driver passengers to the server, assuming the non-driver passengers have granted permission for such communication.

The method 300 may, subsequent to the step described in block 308, proceed when the server transmits, to a mobile device, a request to share costs of the vehicle during the period of operation of the vehicle to a person (e.g., the driver) associated with the mobile device (block 310). The server may be triggered to transmit such a request when the server determines that the period of operation of the vehicle included a TNC trip according to driving performance data and locationing data associated with the actual trip of interest received from the mobile device or on-board computer. In some embodiments, the server may generate or display the request to the driver when the determined risk (e.g., TNC risk index) exceeds a pre-determinable threshold. The request may be in the form of an audible, visual, or haptic alert. For example, the request may be downloaded by a driver of vehicle 108, displayed on a dashboard of the driver's vehicle, an on-board navigator of the driver's vehicle, a mobile device (e.g., mobile device 110), on-board computer (e.g., on-board computer 114) or wearable electronics device display. The request enables a driver to easily be put on notice when the vehicle is traversing a TNC trip, further enabling the driver to share the cost of the vehicle's operation during the TNC trip. In some embodiments, the server may, based upon the TNC risk index, update or adjust an auto, personal, health, life, homeowners, renters, or other insurance premium or discount to reflect risk averse behavior.

Additional Exemplary Cost Sharing

Figure 4:
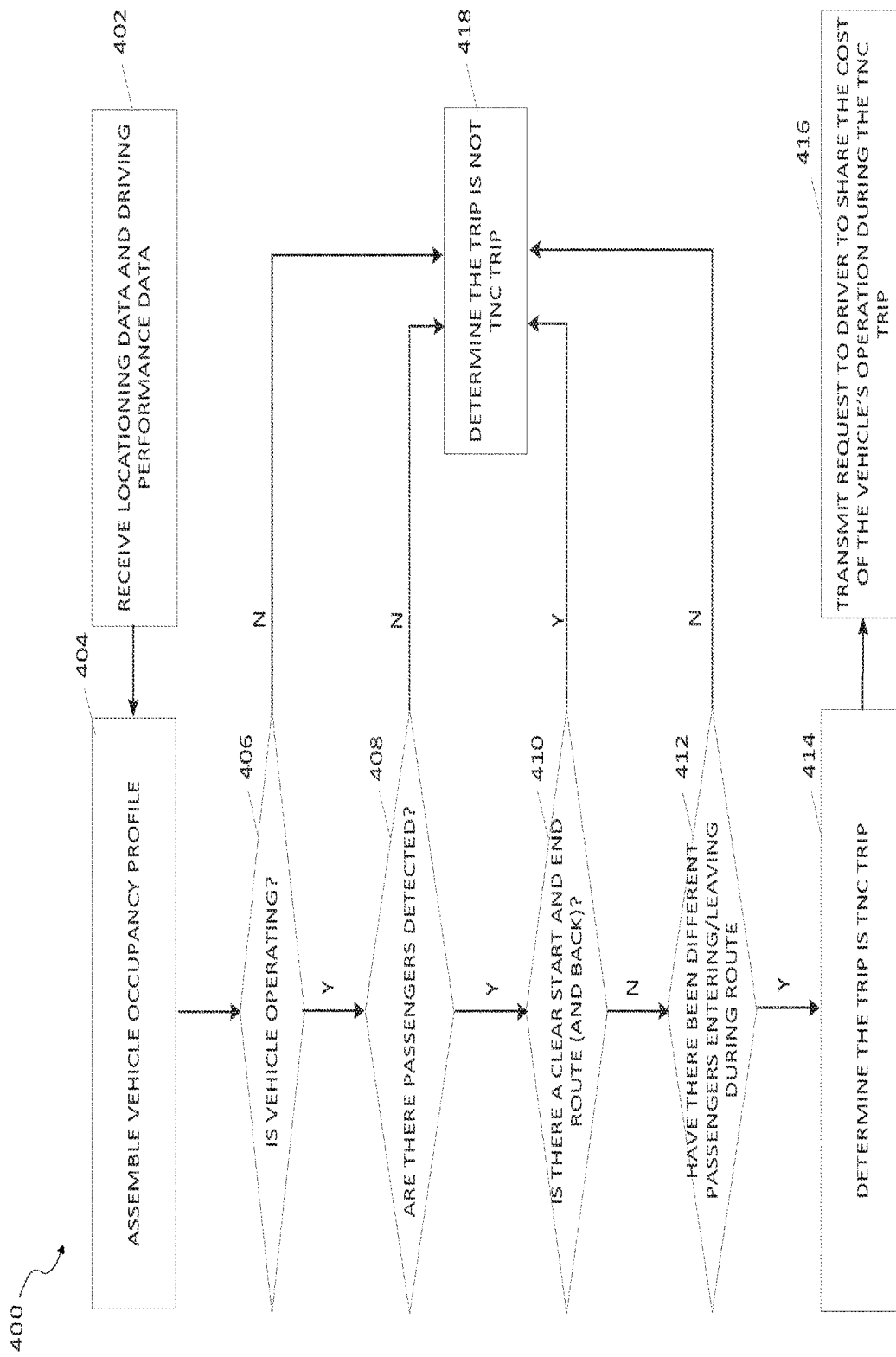
FIG. 4 illustrates an exemplary flowchart for assessing risk associated with TNC trips according to one embodiment.

FIG. 4 illustrates an exemplary computer-implemented method 400 for transmitting a cost share request to a person (e.g., driver) associated with a mobile device according to one embodiment. The method 400 may be implemented, in whole or in part, by the systems 100 or 200 shown in FIGS. 1 and 2, implemented via one or more processors (e.g., processor 210 or processor 162), transceivers, and/or sensors 120, and/or via computer-executable instructions stored on non-transitory computer-readable medium or media. Accordingly, in some embodiments, server 140 having access to driving performance data 252, locationing data 253, and/or claims data 254 may carry out method 400. In other embodiments, on-board computer 114 or mobile device 110 having memory that stores performance data 252, locationing data 253, and/or claims data 254 may carry out method 400. The method 400 may be stored in memory (e.g., program memory 208 or other memory units) or a database (e.g., database 146) as one or more instructions or routines. Although method 400 may thus be carried out by a mobile device, an on-board computer, or a server, for illustration purposes, FIG. 4 will be described as being carried out by a server.

The method 400 may begin when a server (e.g., server 140) receives locationing data and driving performance data (block 402). The locationing data may be based upon the received locationing pulse transmitted from the mobile device to the server. The driving performance data may be collected by front-end components 102 (e.g., sensors 120, mobile device 110, on-board computer 114) and communicated to the server 140 via network 130, for example.

The method 400 may then proceed when the server, via vehicle occupancy evaluator application 142, determines a vehicle occupancy profile based upon the locationing data (e.g., occupancy data) and/or driving performance data (block 404). The vehicle occupancy profile may include occupancy data and other statistics (e.g., average fuel efficiency) of the vehicle 108, as well as telematics data, such as vehicle load weight, planned vehicle route, vehicle configuration, vehicle fuel consumption, vehicle fuel level, tire pressure, and vehicle suspension tuning settings.

From the vehicle occupancy profile, the server may determine whether the vehicle is operating (block 406). For example, the server 140 may determine that a vehicle is in a period of use, and may further determine whether the vehicle is operated manually or autonomously while the vehicle is in use, based upon the received driving performance data. If the server determines that the vehicle is not in use, the server may determine that the vehicle was not in service of a TNC company, or otherwise not being operated as a TNC vehicle, during a period of operation (block 418).

If the server determines that the vehicle is in use, the server may then determine whether any passengers are detected from the vehicle occupancy profile (block 408). For example, the server 140, via vehicle occupancy evaluator application 142, may determine whether the period of use of the vehicle includes TNC trips based upon the received locationing data (e.g., occupancy data). If the server determines that there are no passengers (e.g., no TNC passengers) in the vehicle during the period of use, the server may determine that the vehicle was not in service of a TNC company during the period of operation (block 418).

If the server determines that there are passengers (either TNC passengers or non-TNC passengers) in the vehicle during the period of use, the server may then determine, via the vehicle occupancy evaluator application 142 for example, whether the vehicle traversed a well-defined travel route from the vehicle occupancy profile (block 410), such as starting from the driver's home, heading to the driver's place of employment, and ending at the driver's home for example, based upon the received driving performance data. If the server determines that the vehicle traversed a well-defined travel route more than a pre-determinable number of times, the server may determine that the vehicle was not in service of a TNC company, or otherwise not operating as a TNC vehicle, during the period of operation (block 418).

If the server determines that the vehicle traversed a well-defined travel route less than a pre-determinable number of times, the server may then determine, via the vehicle occupancy evaluator application 142, whether different passengers entered or left the vehicle during a particular route or the period of use based upon the received locationing data (block 412). The stops of the particular route or during the period of use should coincide with a passenger either entering or exiting a vehicle, and as such, the timing of changes in driving performance data, particularly telematics data (e.g., a change in vehicle load weight), may coincide with the timing of changes in locationing data, particularly an irregular signal produced by a seat sensor, for example. If the server determines that different passengers did not enter or leave the vehicle during a particular route or the period of use based upon the received locationing data, the server may determine that the vehicle was not in service of a TNC company during the period of operation (block 418). Otherwise, the server may determine that the vehicle was in service of a TNC company, or otherwise operating as a TNC vehicle, during the period of operation from the vehicle occupancy profile (block 414).

After the server determines that the vehicle was in service of a TNC company, or otherwise operating as a TNC vehicle, during the period of operation, the server may determine or evaluate risk (e.g., calculate a TNC risk index) based upon the detected TNC trips, assess a cost of operation of the vehicle during the detected TNC trips, via the vehicle cost assessor application 143, and/or may transmit, via the vehicle cost balancer application 144, a cost share request to a person (e.g., the driver) and/or non-driver passenger associated with the vehicle based upon the vehicle occupancy profile to share the cost of the vehicle's operation during the TNC trips (block 416).

As described above with respect to FIG. 3, in some embodiments, the server may transmit the cost share request to the driver and/or non-driver passenger when the determined risk exceeds a pre-determinable threshold. The cost share request may be in the form of an audible, visual, or haptic alert. For example, the cost share request may be downloaded by a driver of vehicle 108, displayed on a dashboard of the driver's vehicle, an on-board navigator of the driver's vehicle, a mobile device (e.g., mobile device 110), on-board computer (e.g., on-board computer 114) or wearable electronics device display. An application executed on a mobile device associated with a non-driver passenger may process the cost share request and subsequently present the cost share request via a graphical user interface of the mobile device, as depicted in FIG. 11.

Figure 11:
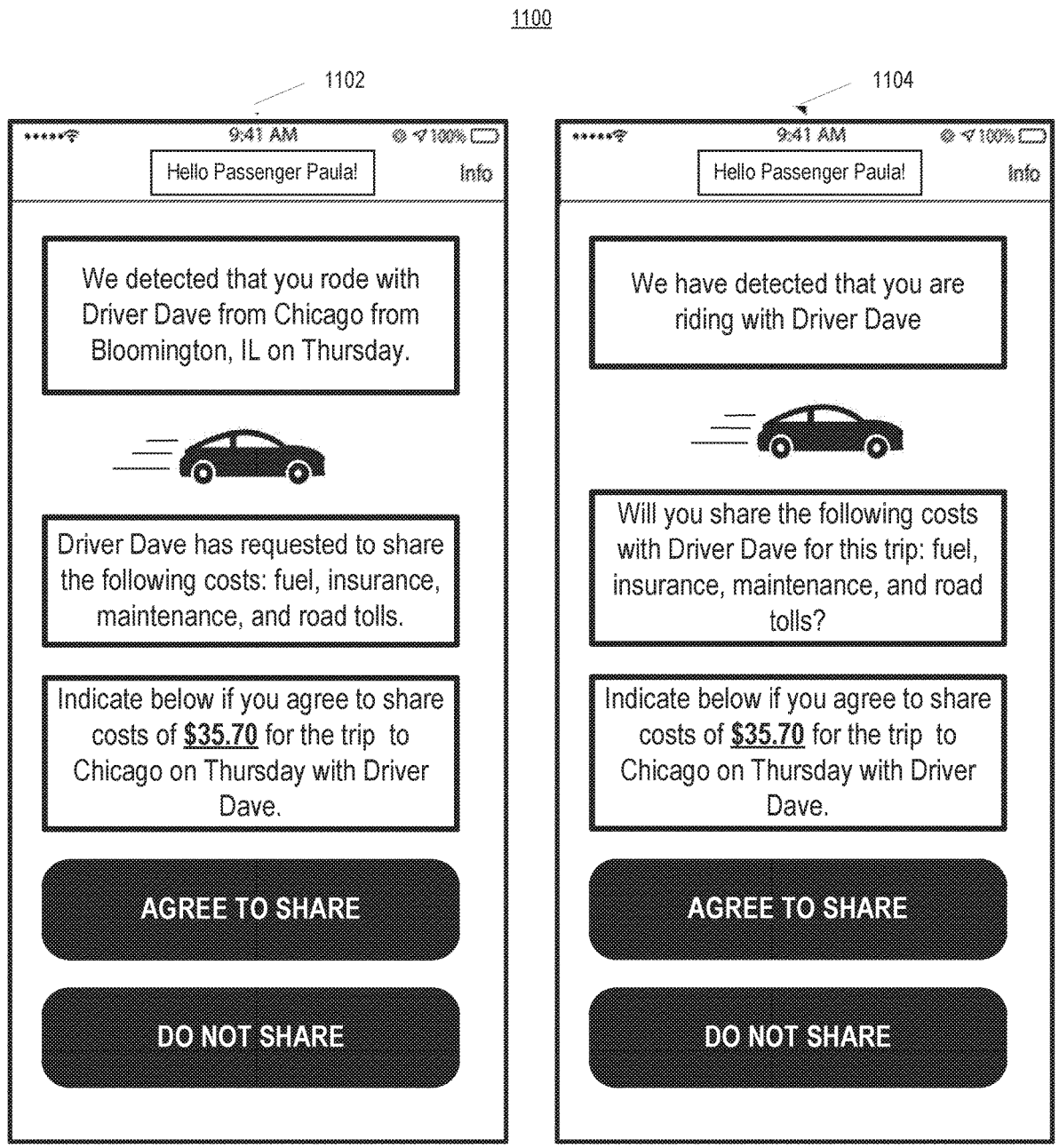
FIG. 11 illustrates an exemplary user interface that depicts various functionalities that may be facilitated by a non-driver passenger of a mobile device.

FIG. 11 depicts an exemplary interface 1100 that depicts various functionalities that may be facilitated by a non-driver passenger of the mobile device. For example, as shown in FIG. 11, the functionalities may include viewing various characteristics of the TNC trip provided by the vehicle occupancy profile, such as identifying the driver of the vehicle, starting location, destination, time/day of the week, and costs associated with the TNC trip, as well as selecting whether to share the costs with the driver or other non-driver passengers.

The total cost of the TNC trip may be generated based upon the occupancy data, telematics data, such as vehicle load weight, planned vehicle route, vehicle configuration, vehicle fuel consumption, vehicle fuel level, tire pressure, and vehicle suspension tuning setting, and other statistics of the vehicle 108 or TNC trip (e.g., average fuel efficiency, insurance costs, maintenance costs, road tolls). The cost assigned to the non-driver passenger may be a portion of the total cost of the TNC trip, and proportional to various factors, such as the number of passengers presently in the vehicle, the number of passengers that have entered or left a vehicle over a period of operation of the vehicle, the length of time a passenger was inside the vehicle, etc.

According to some embodiments, as shown in example interface 1102, the driver of vehicle 108 may specifically request the non-driver passenger to share the costs of the TNC trip. In such embodiments, the server 140 may detect default settings of the driver of vehicle 108 to request sharing of costs, and subsequently communicate the default settings to the interface 1102. In other embodiments, as shown in example interface 1104, the default settings of the application executed on a mobile device associated with a non-driver passenger may request the non-driver passenger to share the costs of the TNC trip.

Regardless of embodiment, both interfaces 1102, 1104 may include a "AGREE TO SHARE" button and a "DO NOT SHARE" button to enable the non-driver passenger to choose whether to share the costs of the TNC trip with the driver or other non-driver passengers. Selection of either button causes the application of the mobile device to send a corresponding response to the cost share request to the server 140, which may in turn provide the response to the mobile device of the driver. As such, the cost share request enables non-driver passengers to easily be put on notice when the vehicle is traversing a TNC trip, further enabling the non-driver passengers to share the cost of the vehicle's operation during the TNC trip.

In some embodiments, the server may, based upon the TNC risk index, update or adjust an auto, personal, health, life, homeowners, renters, or other insurance premium or discount to reflect risk averse behavior. Insurance companies may adjust rates based upon how often a particular driver participates in TNC trips. This rate adjustment may be based upon an estimate, or may be implemented as part of a dynamic rate policy. For example, an insurance company may implement a dynamic rate responsive to a driver's real-time behavior, and may reward risk-averse drivers. Thus, the rate may dynamically increase or decrease as a driver participates in more or less TNC trips, respectively.

Exemplary Vehicle Interiors

Figure 5:
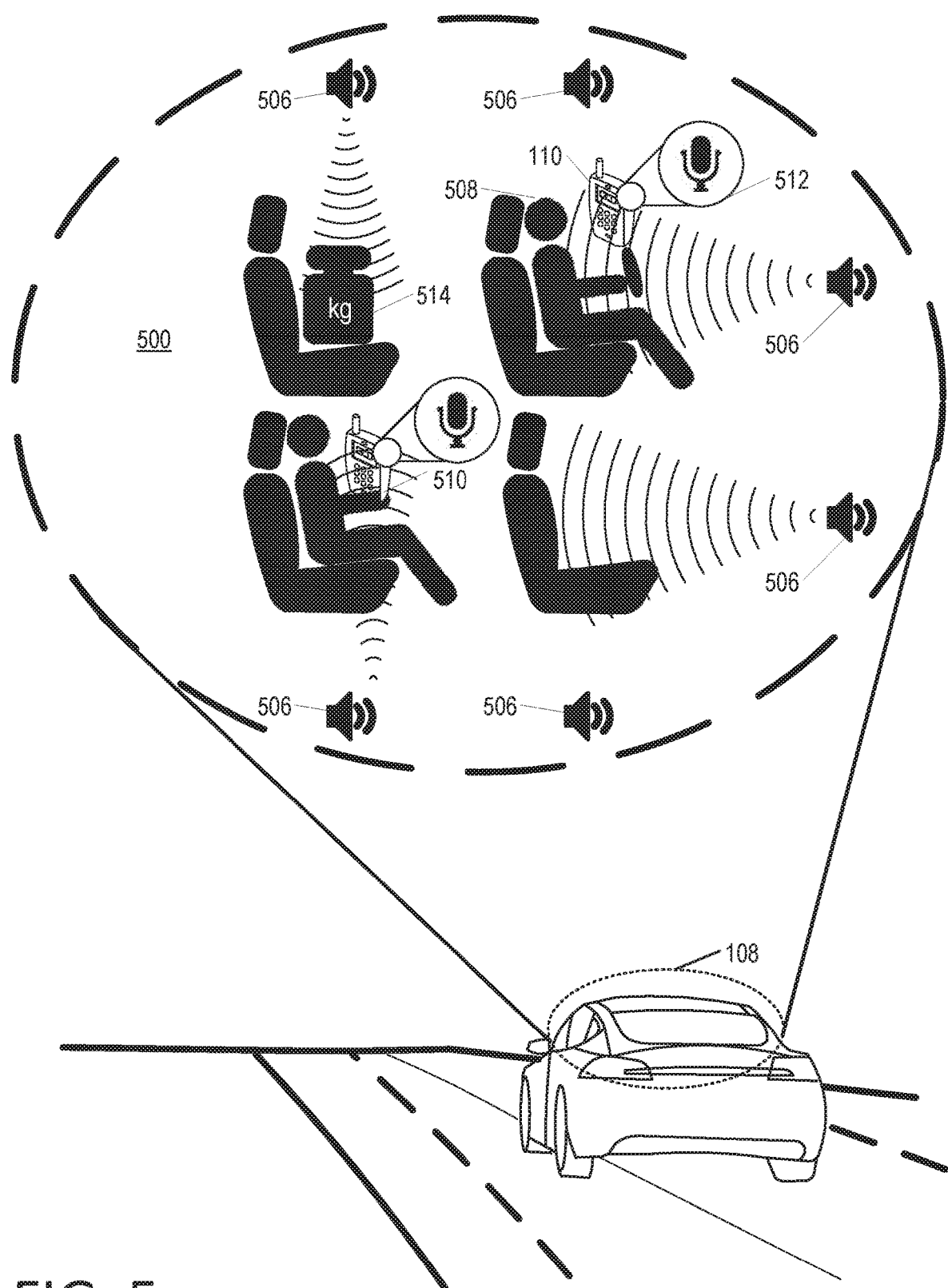
FIG. 5 illustrates an exemplary interior of a vehicle on which the methods described herein may be implemented.

FIG. 5 illustrates an exemplary interior 500 of a vehicle on which the methods described herein may be implemented. As shown, the interior 500 of vehicle 108 may include a speaker system including a plurality of speakers 506. In some embodiments, the mobile device 110 (or on-board computer 114, not illustrated) may transmit a locationing pulse request to one or more speakers 506 over a short-range communication protocol (e.g., Bluetooth).

Figure 6:
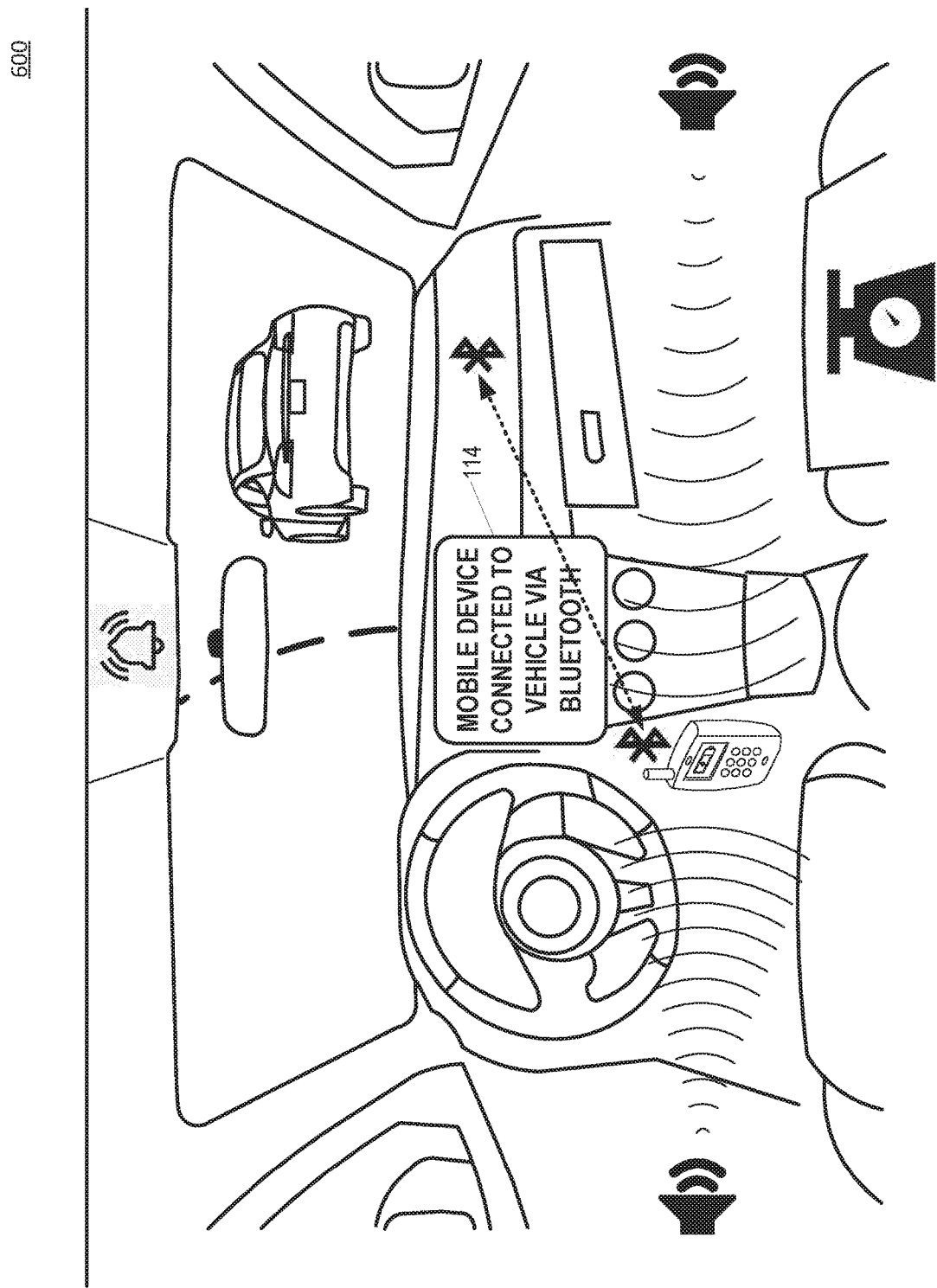
FIG. 6 illustrates an exemplary interior of a vehicle having a message indicating that a mobile device of a driver is connected to the vehicle via a short-range communication protocol.

In such embodiments, as indicated in FIG. 6, the on-board computer 114 of interior 600 of vehicle 108 may display a message indicating that the mobile device 110 is connected to the vehicle 108 via Bluetooth. The locationing pulse request may include a request for the one or more speakers 506 to emit a locationing pulse. In response to receiving the locationing pulse request, the speakers 506 may emit a locationing pulse back to the mobile device 110, which may in turn receive/detect the locationing pulse via a microphone 512 of the mobile device 110.

Figure 7:
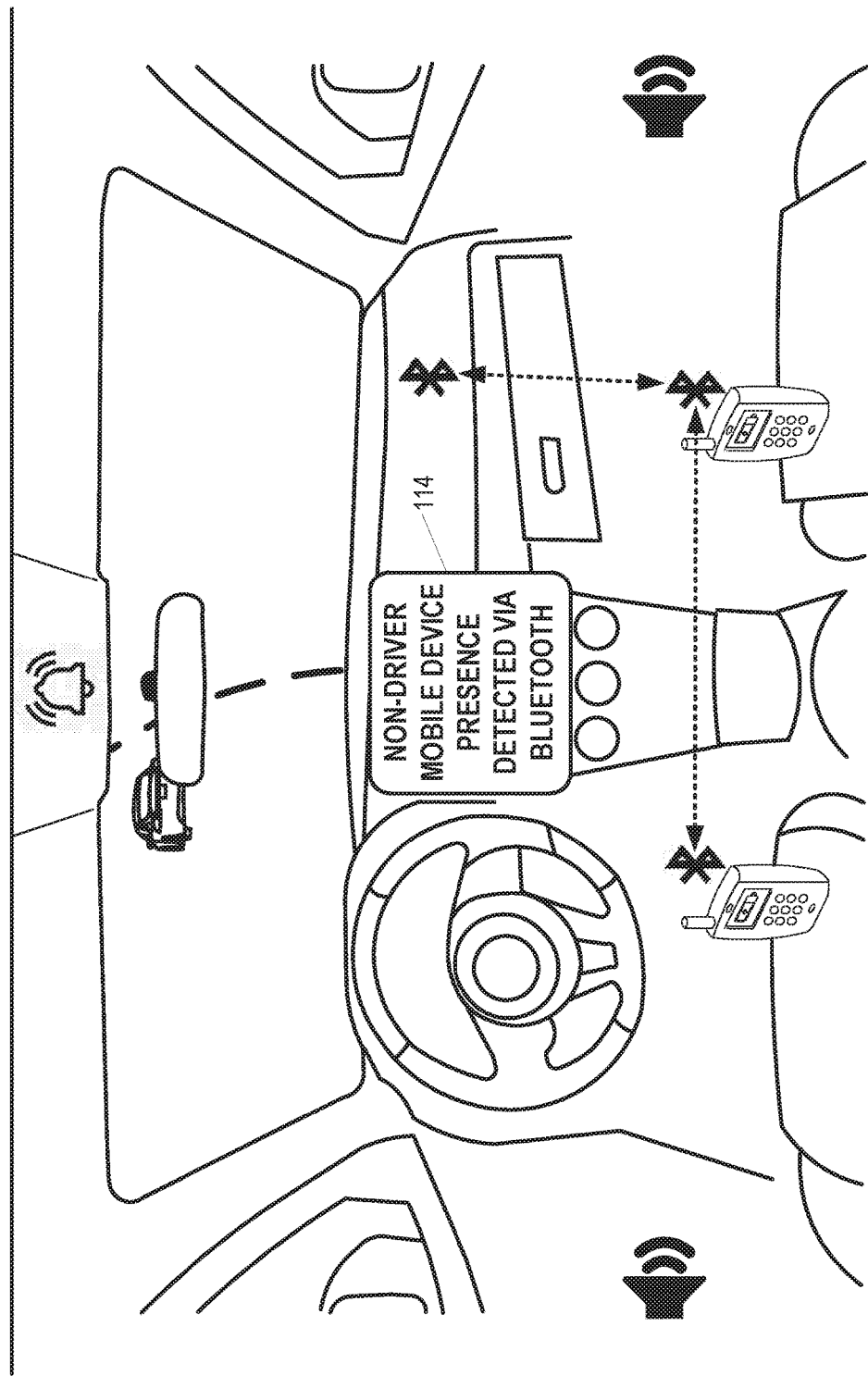
FIG. 7 illustrates an exemplary interior of a vehicle having a message indicating that a mobile device of a non-driver passenger is connected to the vehicle via a short-range communication protocol.

The mobile device 110 may process the locationing pulse and further determine configuration information (e.g., locationing data) concerning the interior 500 of the vehicle 108, such as whether a seat is occupied by a person 508 or object 514, detecting passengers that have entered or left the vehicle over a period of operation of the vehicle, or the locations of other mobile devices 510. If the mobile device 110 determines the locations of other mobile devices 510, the on-board computer 114 of interior 700 of vehicle 108 may display a message indicating that another mobile device (e.g., mobile device 510) associated with a non-driver passenger has been detected via Bluetooth as indicated in FIG. 7, in some embodiments.

Exemplary Machine Learning

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. In some embodiments, the methods and systems described herein may use machine learning techniques to identify and estimate the effects of observed or latent variables such as vehicle location, time of day, presence of passengers, a particular area of traffic, a volume of traffic (e.g., a number of cars per hour), or other such variables that influence the risks associated with transportation network company trips.

Some embodiments described herein may include automated machine learning to collect driving performance data or locationing data, detect/process the locationing pulse, determine configuration information (e.g., locationing data) concerning the interior of the vehicle, such as whether a seat is occupied by a person or object, detecting passengers that have entered or left the vehicle over a period of operation of the vehicle, or the locations of other mobile devices, recognize route patterns of the vehicle that are indicative of TNC trips based upon both the locationing data and driving performance data, generate or transmit notifications to drivers or non-driver passengers, and/or perform other functionality as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element (e.g., mobile device 110, on-board computer 114, and/or server 140 of FIGS. 1 and 2) may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data, in order to facilitate making predictions. Models may be created based upon example inputs of data in order to make valid and reliable predictions for novel inputs.

Additionally or alternatively, the machine learning programs may be trained by inputting sample data sets or certain data into the programs, such as mobile device, vehicle, or smart infrastructure sensor and/or control signal data, and other data discussed herein. The machine learning programs may utilize deep learning algorithms that are primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated.

The machine learning programs may be trained with vehicle-mounted, home-mounted, and/or mobile device-mounted sensor data to identify certain customer activity, such as routine travel (e.g., non-TNC trips) or non-route travel (e.g., TNC trips) at certain times of day.

After training, machine learning programs (or information generated by such machine learning programs) may be used to evaluate additional data. Such training data may be related to past and/or historical data gathered by smart vehicles, mobile device, or smart infrastructure, or other similar data to be analyzed or processed. The trained machine learning programs (or programs utilizing models, parameters, or other data produced through the training process) may then be used for determining, assessing, analyzing, predicting, estimating, evaluating, or otherwise processing new data not included in the training data. Such new or additional data may be related to current, up-to-date, or real-time data gathered by smart vehicles, mobile device, smart infrastructure, or other sensors and cameras, or other similar data to be analyzed or processed. Such trained machine learning programs may, thus, be used to perform part or all of the analytical functions of the methods described elsewhere herein.

Additional Considerations

With the foregoing, an insurance customer (e.g., a driver) may opt-in to a rewards, insurance discount, or other type of program. After the insurance customer provides their affirmative consent, an insurance provider remote server may collect data from the customer's mobile device, smart vehicle, autonomous or semi-autonomous vehicle, smart home controller, or other smart devices—such as with the customer's permission or affirmative consent. The data collected may be related to smart or autonomous vehicle functionality, smart home functionality (or home occupant preferences or preference profiles), and/or insured assets before (and/or after) an insurance-related event, including those events discussed elsewhere herein. In return, those insured may receive discounts or insurance cost savings related to auto, home, renters, personal articles, mobile, and other types of insurance from the insurance provider.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

All of the foregoing methods discussed herein may include additional, less, or alternate actions, including those discussed elsewhere herein. All of the foregoing methods may be implemented via one or more local or remote processors, transceivers, servers, and/or sensors, and/or via computer-executable instructions stored on computer-readable medium or media. The foregoing devices and systems may also include additional, less, or alternate functionality, including that discussed elsewhere herein.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. Finally, unless a claim element is defined by reciting the word "means" and a function without the recital of any structure, it is not intended that the scope of any claim element be interpreted based upon the application of 35 U.S.C. § 112(f). The patent claims at the end of this patent application are not intended to be construed under 35 U.S.C. § 112(f) unless traditional means-plus-function language is expressly recited, such as "means for" or "step for" language being explicitly recited in the claim(s).

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for generating, modifying, and/or using driver profiles through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of cost sharing among occupants of a vehicle, the method comprising:

transmitting a plurality of locationing pulse requests from a mobile device in a vehicle to an audio system of the vehicle during a period of operation of the vehicle via a short-range communication protocol, the audio system having an array of speakers disposed inside the vehicle, and the locationing pulse requests including a request to emit a locationing pulse from at least one of the array of speakers;

emitting the locationing pulse from the at least one of the array of speakers disposed inside the vehicle in response to the request, the locationing pulse comprising an audio signal;

receiving the locationing pulse at a microphone of the mobile device;

analyzing the locationing pulse to determine a vehicle occupancy profile of the vehicle indicative of whether one or more non-driver passengers occupied the vehicle during at least part of the period of operation of the vehicle;

determining an identity associated with each of the one or more non-driver passengers;

wherein the determining the identity comprises receiving a transmission from a mobile device associated with one of the one or more non-driver passengers via a wireless communication;

wherein the transmission indicates that one of the one or more non-driver passengers was present in the vehicle during at least part of the period of operation;
assessing a cost of operation of the vehicle during the period of operation; and
transmitting a request to share costs of the vehicle during the period of operation of the vehicle to one of the one or more non-driver passengers.

2. The computer-implemented method of claim 1, wherein the determining the identity comprises detecting a wireless communication between the mobile device and other mobile devices associated with each of the one or more non-driver passengers.

3. The computer-implemented method of claim 1, wherein the determining the identity comprises receiving the locationing pulse at other mobile devices associated with each of the one or more non-driver passengers.

4. The computer-implemented method of claim 1, wherein the transmitting the request comprises transmitting a request for the identity of one or more of the non-driver passengers.

5. The computer-implemented method of claim 1, wherein the transmitting the request is based at least in part on a distance traveled by the vehicle during the period of operation.

6. The computer-implemented method of claim 1, wherein the transmitting the request comprises transmitting the identity of a reimbursing entity.

7. A system for cost sharing among occupants of a vehicle comprising:
a memory configured to store non-transitory computer executable instructions; and
a processor configured to interface with the memory, wherein the processor is configured to execute the non-transitory computer executable instructions to cause the processor to:
receive locationing pulse data from one or more mobile devices, the locationing pulse data being based upon locationing pulses received by the one or more mobile devices, the locationing pulses emitted from an audio subsystem of a vehicle in response to locationing pulse requests transmitted from the one or more mobile devices, the locationing pulses comprising an audio signal, the locationing pulse requests being transmitted via a short-range communication protocol;
analyze the received locationing pulse data to determine a vehicle occupancy profile of the vehicle indicative of whether one or more non-driver passengers occupied the vehicle during a period of operation;
receive a transmission from a mobile device associated with one of the one or more non-driver passengers via a wireless communication, the transmission indicating that one of the one or more non-driver passengers was present in the vehicle during at least part of the period of operation;
determine an identity associated with each of the one or more non-driver passengers based at least in part upon the transmission;
assess a cost of operation of the vehicle during the period of operation; and
transmit a request to share the cost of operation of the vehicle during the period of operation to one of the one or more non-driver passengers based upon the vehicle occupancy profile.

8. The system of claim 7, wherein the processor is further configured to receive an agreement from one of the one or more non-driver passengers to pay part of the cost of operation of the vehicle during the period of operation.

9. The system of claim 8, wherein the agreement to pay part of the cost of operation of the vehicle during the period of operation is based upon a vehicle mileage during the period of operation of the vehicle.

10. The system of claim 8, wherein the agreement to pay part of the cost of operation of the vehicle during the period of operation includes a real-time deposit of money during the period of operation of the vehicle.

11. The system of claim 8, wherein the agreement to pay part of the cost of operation of the vehicle includes payment of fees incurred during the period of operation of the vehicle.

12. The system of claim 7, wherein the processor is further configured to receive an identity of the one of the non-driver passengers from a driver of the vehicle.

13. The system of claim 8, wherein the agreement to pay part of the cost of operation of the vehicle during the period of operation is based upon a length of time that one of the one or more non-driver passengers occupied the vehicle during the period of operation.

14. A computer-implemented method of cost sharing insurance costs of a vehicle, the method comprising:
transmitting a plurality of requests to a vehicle to emit locationing pulses from an audio subsystem of the vehicle during a period of operation of the vehicle via a short-range communication protocol, the audio subsystem having an array of speakers disposed inside the vehicle, and the locationing pulse requests including a request to emit a locationing pulse from at least one of the array of speakers;
emitting locationing pulses from the audio subsystem of the vehicle in response to the plurality of requests, the locationing pulses comprising an audio signal;
receiving occupancy data during the period of operation from the vehicle in response to the requests to emit locationing pulses, the occupancy data being based upon locationing pulses received by one or more mobile devices;
determining one or more passenger profiles based upon the occupancy data indicative of whether one or more non-driver passengers occupied the vehicle during a period of operation;
receiving a transmission from a mobile device associated with one of the one or more non-driver passengers via a wireless communication, the transmission indicating that one of the one or more non-driver passengers was present in the vehicle during at least part of the period of operation;
determining an identity associated with each of the one or more non-driver passengers based at least in part upon the transmission;
assessing a cost of operation of the vehicle during the period of operation; and
transmitting a request to share insurance costs of the vehicle during the period of operation to one of the one or more non-driver passengers.

15. The computer-implemented method of claim 14, wherein the transmitting the request is based at least in part on insurance coverage associated with at least one of the one or more passenger profiles.

16. The computer-implemented method of claim 14, wherein the transmitting comprises transmitting the request to share insurance costs to a person associated with one of the passenger profiles.

17. The computer-implemented method of claim 14, wherein the transmitting comprises transmitting the request to share insurance costs to an entity not associated with one of the passenger profiles.

18. The computer-implemented method of claim 14, wherein the transmitting comprise transmitting the request to share insurance costs to a person associated with one of the passenger profiles and the insurance costs are prorated according to a length of time the person was inside the vehicle during the period of operation.

19. The computer-implemented method of claim 14, wherein the transmitting the request comprises transmitting usage-based insurance pricing.

20. The computer-implemented method of claim 1, wherein the analyzing comprises comparing the emitted locationing pulse and the received locationing pulse.

21. The system of claim 7, wherein the processor is further configured to compare the emitted locationing pulses and the received locationing pulses.

22. The computer-implemented method of claim 14, wherein the determining comprises comparing the emitted locationing pulse and the received locationing pulses.

\* \* \* \* \*